United States Patent
Byerley

(10) Patent No.: US 11,625,097 B2
(45) Date of Patent: *Apr. 11, 2023

(54) SYSTEM AND METHODS FOR RECREATIONAL SPORT HEADS-UP DISPLAY CONTROL

(71) Applicant: Dish Network L.L.C., Englewood, CO (US)

(72) Inventor: Seth Byerley, Englewood, CO (US)

(73) Assignee: Dish Network L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/500,799

(22) Filed: Oct. 13, 2021

(65) Prior Publication Data

US 2022/0066554 A1 Mar. 3, 2022

Related U.S. Application Data

(60) Continuation of application No. 16/892,078, filed on Jun. 3, 2020, now Pat. No. 11,169,606, and a division
(Continued)

(51) Int. Cl.
*G09G 5/00* (2006.01)
*G06F 3/0482* (2013.01)
(Continued)

(52) U.S. Cl.
CPC ............ *G06F 3/014* (2013.01); *A63C 11/228* (2013.01); *G01C 21/20* (2013.01); *G02B 27/017* (2013.01);
(Continued)

(58) Field of Classification Search
None
See application file for complete search history.

(56) References Cited

U.S. PATENT DOCUMENTS 4,440,421 A 4/1984 Adamson
10,475,243 B2 11/2019 Marshall et al.
(Continued)

OTHER PUBLICATIONS

Baldwin, "Motorcycle helmets finally get decent heads-up display navigation," Jul. 27, 2017, retrieved from https://www.engadget.com/2017/07/27/nuviz-headsup-display/, 13 pages.
(Continued)

*Primary Examiner* — Duane N Taylor, Jr.
(74) *Attorney, Agent, or Firm* — Jeremiah J. Baunach; VLP Law Group LLP

(57) ABSTRACT

Technologies are disclosed herein for controlling a head-mountable heads-up display system comprising a heads-up display unit and a hand cover. The hand cover includes a plurality of input elements located on appendages thereof that are configured to cause the hand cover to transmit input signals to the heads-up display unit. The heads-up display unit is configured to display virtual image content within a field of view of a user. As a result of receiving a user input, the heads-up display unit may display virtual image content based on a user input. The heads-up display unit updates the virtual image content as a result of receiving an input signal corresponding to an interaction between a pair of input elements of the hand cover. The heads-up display system may be useable in connection with a system of an outdoor recreational area to obtain information regarding the outdoor recreational area.

18 Claims, 15 Drawing Sheets

Related U.S. Application Data of application No. 16/175,473, filed on Oct. 30, 2018, now Pat. No. 10,712,819.

(51) Int. Cl.
*G02B 27/01* (2006.01)
*A63C 11/22* (2006.01)
*G01C 21/20* (2006.01)
*H04L 67/131* (2022.01)
*G06F 3/01* (2006.01)

(52) U.S. Cl.
CPC ........... *G06F 3/0482* (2013.01); *G09G 5/006* (2013.01); *H04L 67/131* (2022.05); *G02B 2027/014* (2013.01); *G09G 2330/02* (2013.01); *G09G 2354/00* (2013.01); *G09G 2370/02* (2013.01); *G09G 2370/04* (2013.01); *G09G 2370/16* (2013.01)

(56) References Cited

U.S. PATENT DOCUMENTS

| | | |
|---|---|---|
| 2003/0168845 A1 | 9/2003 | Houden |
| 2014/0125577 A1 | 5/2014 | Hoang et al. |
| 2015/0302665 A1 | 10/2015 | Miller |
| 2015/0362733 A1* | 12/2015 | Spivack .............. G02B 27/017 345/633 |
| 2016/0084661 A1 | 3/2016 | Gautama et al. |
| 2017/0038839 A1 | 2/2017 | Seth |
| 2017/0039045 A1 | 2/2017 | Abrahami et al. |
| 2018/0040161 A1 | 2/2018 | Tierney et al. |
| 2018/0189568 A1 | 7/2018 | Powderly et al. |
| 2018/0256115 A1 | 9/2018 | Campbell et al. |

OTHER PUBLICATIONS

Berry, "The Application of a Triboelectric Energy Harvester in the Packaged Product Vibration Environment," Theses, Clemson University, TigerPrints, May 2016, 73 pages.
Choi, "Surprise finding about moon puts hunt for alien life in new light," NBC News, Aug. 10, 2017, updated Aug. 14, 2017, retrieved from https://www.nbcnews.com/mach/science/surprise-finding-about-moon-puts-hunt-alien-life-new-light-ncna791566, 4 pages.
Choi, "These Unbelievably Tiny Tags Promise Big Advances in Medical Care," NBC News, Aug. 1, 2017, retrieved from https://www.nbcnews.com/mach/science/these-unbelievably-tiny-tags-promise-big-advances-medical-care-ncna788436, 4 pages.
CNET, "Zeal Optics goggles," Feb. 12, 2020, retrieved from https://www.cnet.com/pictures/best-high-tech-ski-gear-pictures/15, 3 pages.
Coldewey, "Google, Levi's Weave Tech Into Textiles With Project Jacquard," NBC News, May 29, 2015, retrieved from https://www.nbcnews.com/tech/innovation/googles-project-jacquard-weaves-tech-textiles-n366756, 3 pages.
Gammon, "Health-Sensing Clothes May Save Lives of Infants, First Responders," NBC News, Jun. 6, 2017, updated Oct. 6, 2017, retrieved from https://www.nbcnews.com/mach/mach/health-sensing-clothes-may-save-lives-infants-first-responders-ncna768721, 4 pages.
SENA Communication, "Find Your SENA Device," 2020, retrieved from https://www.sena.com/motorcycles-powersports/communication, 5 pages.
Shield, "Signalproof Beanies," 2020, retrieved from https://shieldapparels.com/products/signalproof-beanie, 7 pages.

* cited by examiner

SYSTEM AND METHODS FOR RECREATIONAL SPORT HEADS-UP DISPLAY CONTROL

BACKGROUND

Technical Field

The present disclosure relates to a head-mounted heads-up display system and a control method for a heads-up display device.

Description of the Related Art

Heads-up displays (HUDs) are devices provided with an electronic display that generates an image displayed within a user's normal field of view. HUDs have been used in a variety of applications from automobiles to airplanes in order to easily provide users with useful information. Some HUDs are provided as part of a head-mounted unit that can be worn on a user's head for overlaying information on top of or in the user's field of view. HUDs may have associated user input devices for controlling aspects of the image displayed, such as controlling the information content displayed. Previously, the user input devices of some HUDs have a joystick or pad for controlling a pointer or other selector in the image displayed. These user input devices are typically hand-held devices that occupy an entire hand when in use, and are stored in a pocket or bag separately when not in use. The hand-held nature of HUD input devices has been an obstacle to adoption in connection with athletic activities where a user's hands are engaged to participate in the activity. At a snow resort, for example, a user wearing a head-mounted HUD would have to store an input device for the HUD in a jacket pocket while skiing, and access the input device once the skier has stopped, often needing to remove excess equipment to access the HUD controller.

BRIEF SUMMARY

Embodiments disclosed herein are directed to heads-up display systems having a head-mounted heads-up display unit and a hand-worn input unit for controlling the heads-up display unit that is operable to control the head-mounted HUD. The hand-worn input unit has the shape of a glove or mitten, and includes a plurality of input elements provided on appendages thereof that are used to control the heads-up display unit. The input elements may include electronic components having electrical characteristics that change as a result of touch or pressure applied thereto. The hand-worn input unit transmits input signals to the heads-up display unit as a result of interactions involving the input elements, such as an interaction between a pair of the input elements. The heads-up display unit performs one or more operations based on the particular input signal received, which may include causing display of virtual image content. Advantageously, the hand-worn input unit allows a user to control the heads-up display unit without having to carry or access a separate hand-held controller. The hand-worn shape of the input unit provides an ergonomic device for providing user input that is intuitive and familiar.

The configuration of the heads-up display system may be particularly well-suited for outdoor recreational areas like ski resorts. A skier or snowboarder wearing the heads-up display system may use the hand-worn input device to obtain or display information about the ski resort without having to take off their gloves or mittens, and without having to access a separate hand-held controller. The user may operate the hand-worn input device to cause the heads-up display unit to present geographic information regarding locations of runs within the ski resort, wait times for ski lifts, weather and snow conditions throughout the ski resort, and information outside of the ski resort such as traffic or weather information. Other applications may include snowmobiling, golfing, and bicycle transit in a city or town.

DETAILED DESCRIPTION

Figure 1:
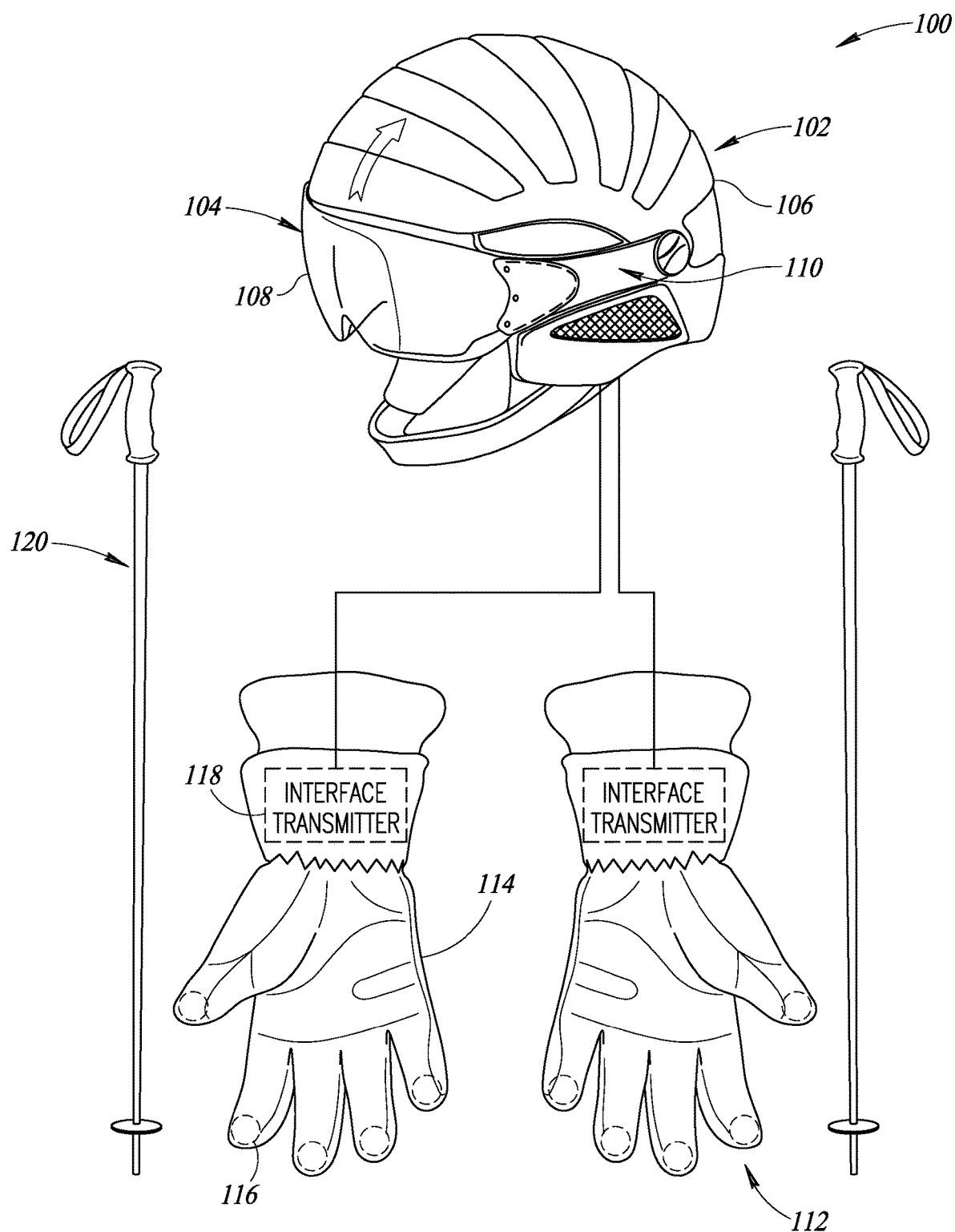
FIG. 1 illustrates a heads-up display system in accordance with embodiments described herein.

FIG. 1 shows an exterior of a head-mounted HUD system 100 for selectively displaying virtual imagery to a user according to one or more embodiments. The HUD system 100 includes a HUD unit 102 that is mountable to a head of a user for selectively displaying virtual visual content directly in the user's field of view. The HUD unit 102 of the current embodiment has a display 104 mounted on a helmet body 106 of the HUD unit 102. The display 104 has a transparent lens 108 through which a user can view scenery external to the HUD unit 102 and virtual image content provided by a virtual image display unit 110 of the HUD unit 102. The virtual image display unit 110 produces virtual image light that a user wearing the HUD unit 102 may view while also viewing scenery external to the HUD unit 102 at the same time. In one embodiment, the virtual image display unit 110 may produce image light that is projected onto a user's eye or onto the transparent lens 104 for viewing by the user. The virtual image display unit 110 in the current embodiment is physically coupled to the transparent lens 108 to form an integral unit. The display 104 of the current embodiment has a shape of a visor that is rotatable relative to the helmet body 106. In particular, the visor is rotatable about an axis between a deployed position covering the user's eyes and a stowed position on top of the helmet body 106. In some embodiments, the HUD unit 102 may not include the helmet body 106 and may instead be in the form of a pair of goggles with a strap to attach the display 104 to a user's head. In such embodiments, the HUD unit 102 may include a housing containing at least some of the components discussed below with respect to FIG. 3.

The virtual image display unit 110 may include light-generating elements, optical elements, and control elements that generate image light for causing the user to view virtual image content via the display 104. The virtual image display unit 110 may generate virtual image light that is viewable by a single eye of the user. The virtual image light may be projected directly or indirectly onto a user's eye causing the user to perceive the virtual image content. The display 104 may include a second virtual image display unit (not pictured) on a side opposite to the virtual image display unit 110 that generates image light in concert with the virtual image display unit 110 to cause the user to binocularly perceive the virtual image content. The transparent lens 108, in some embodiments, may also include optical elements having properties that reflect projected image light from the virtual image display unit 110 onto a user's eye. The transparent lens 108 may include optical elements that diffract or refract the virtual image light generated by the virtual image display unit 110 to cause the user to appropriately perceive the virtual image content. In some embodiments the virtual image display unit 110 may control transparent light-emitting elements in the lens 108 for generating virtual image content within the user's field of view.

The HUD unit 102 may include various peripheral devices that provide additional functionality to the HUD system 100. For instance, the HUD unit 102 may include a communication interface including one or more communication transceivers for sending and receiving information over a network or for communicating with other persons. The HUD unit 102 may include a camera for capturing image data, a microphone for capturing audio information, and one or more speakers located in or near ear portions of the HUD unit 102. The HUD unit 102 may include sensors, such as accelerometers and thermometers, and an emergency beacon for helping to locate the user in case of emergency. Further details regarding peripheral devices are discussed in further detail infra. The HUD system 100 may further include a pair of ski poles 120 for wirelessly providing power to one or both input devices 112, as discussed below in further detail. The HUD unit 102 may include a powered air-circulation unit that automatically or selectively circulates air in or around the transparent lens 108 to prevent or ameliorate fogging of the lens 108.

The HUD system 100 comprises one or two input devices 112 for providing user input to control various aspects of the HUD unit 102. The input devices 112 each have a body 114 sized and shaped to substantially or entirely cover a user's hand and respectively encapsulate the fingers and thumb of the hand. In the current embodiment, the input devices 112 are in the form of gloves respectively having separate appendages for separately accommodating a user's thumb and fingers. A thin pair of gloves that function as glove liners are commonly used with ski gloves and in a preferred embodiment, the input device 112 are glove liners that are thin and have the electronic components sewn, glued, soldered, or otherwise attached. A second pair of gloves which are thicker and waterproof can be worn over the glove liners. In some embodiments, the input devices 112 may be in the form of a mitten, or gloves having at least one appendage sized to fit two or more fingers of a user—for example, gloves commonly known as lobster claw gloves. A plurality of input elements 116 are located in appendages of at least one input device 112. The input elements 116 can be positioned on the inside layer of the input device 112 in the form of a glove, in the middle or in a watertight sealed outer layer.

In some embodiments, one or more input elements may be disposed in other locations of the input device 112. A user wearing the input devices 112 may control the HUD unit 102 via interactions involving one or more of the input elements 116. For instance, as a result of a user touching fingertips together, pairs of the input devices 116 may interact with each other, causing an input device 112 to provide an input signal to the HUD unit 102. In some embodiments, the HUD system 100 may include only a single input device 112 for controlling the HUD unit 102.

One or both input devices 112 may include a transmitter 118 configured to send input signals to the HUD unit 102. In some embodiments, the input devices 112 are not physically coupled to the HUD unit 102, and wirelessly transmit input signals to the HUD unit 102. In such embodiments, the transmitter 118 may be a short or medium range wireless transmitter using one or more communication protocols, such as a Bluetooth™, ZigBee™, or other wireless area network protocol, to transmit input signals to the HUD unit 102. In some embodiments, one or both input devices 112 are physically and electrically coupled to the HUD unit 102 via a cable or wire over which the input devices 112 transmit input signals to the HUD unit 102.

Figure 2A:
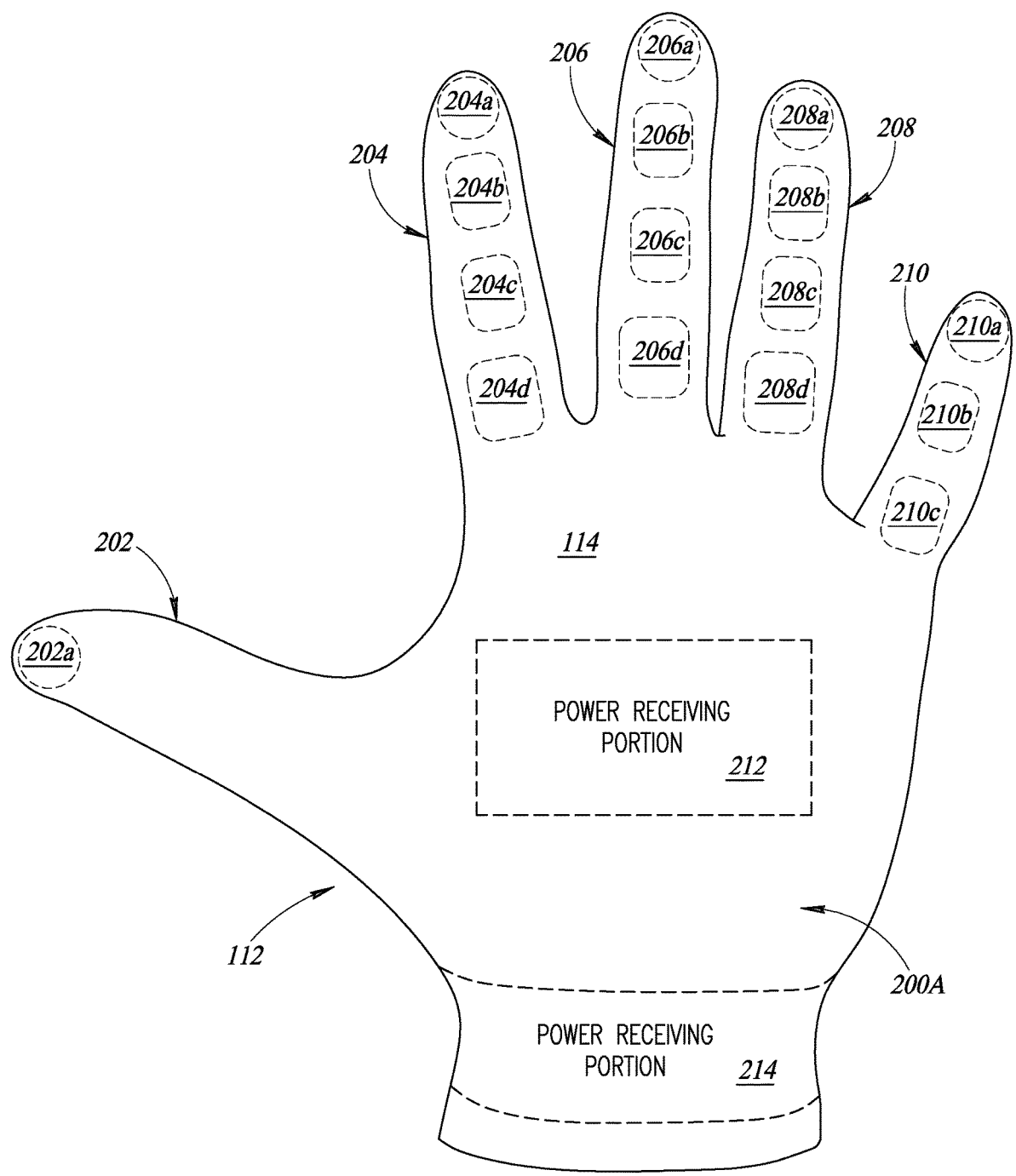
FIG. 2A illustrates a first plan view of a hand-worn input device of the heads-up system of FIG. 1.

FIG. 2A shows a view of a palm 200A of a hand-worn input device 112 according to one or more embodiments. The body 114 of the user input device is formed of a flexible textile material, such as polyester, nylon, acrylic, or wool. The user device 112 has a plurality of appendages including a thumb 202 for accommodating a user's thumb and a plurality of fingers 204, 206, 208, and 210 for respectively accommodating individual fingers of the user's hand. Input elements are located in various parts of the thumb 202 and the fingers 204, 206, 208, and 210. An input element 202a is located in a tip portion of the thumb 202. The index finger 204 may include an input element 204a located in a tip portion of the index finger 204, and may include one or more input elements 204b through 204d located along a length of the index finger 204 on the palm-side 200A. The middle finger 206 may include an input element 206a located in a tip portion of the middle finger 206, and may include one or more input elements 206b through 206d located along a length of the middle finger 206 on the palm-side 200A. The ring finger 208 may include an input element 208a located in a tip portion of the ring finger 208, and may include one or more input elements 208b through 208d located along a length of the ring finger 208 on the palm-side 200A. The little finger 210 may include an input element 210a located in a tip portion of the little finger 210, and may include one or more input elements 210b and 210c located along a length of the little finger 210 on the palm-side 200A. The user input device 112 may include more or fewer input elements on the palm-side than depicted or described. The input elements 116 are embedded, woven, or otherwise integrated into the body 114 of the input device 112. The input elements 116 have a thin thickness that does not interfere with the user's ability to grip or hold objects when a user wears the input device 112.

The input elements 116 may be touch sensor elements having a particular electrical property that is affected as a result of pairs of the input elements 116 being in close proximity to each other, or as a result of pressure being applied to pairs of the input elements 116. In some embodiments, the touch sensor elements are conductive plates having a surface area unique to each input element 116 among the plurality of input elements 116. For instance, the input element 202a of the thumb 202 may be a conductive plate having a first area, the input element 204a of the index finger 204 may be a conductive plate having a second area, the input element 206a of the middle finger 206 may be a conductive plate having a third area different than the second area, and so on. The surface area of conductive plates on each individual finger may be different from one another— for instance, the first input element 204a is a conductive plate having a different area than the input elements 204b through 204d of the index finger 204, the second input element 204b is a conductive plate having a different area than the input elements 204c and 204d, and so on. The material of the body 114 may form at least part of a dielectric between conductive plates in close proximity. Accordingly, the dielectric of the body 114 material and the conductive plates of input elements 116 positioned in close proximity form a capacitor having a particular capacitance, as described below in further detail. The input device 112 may include circuitry that generates a signal having a particular electrical characteristic as a result of the capacitor formed by proximate input elements 116.

In some embodiments, one or more of the touch sensor elements of the input elements 116 may include capacitors or resistors having a value that varies as a result of pressure being applied thereto. In such embodiments, the static resistance value or static capacitance value of the input elements 116 is unique to each input element 116 among the plurality of input elements 116. For instance, the input element 202a of the thumb 202 may include a capacitor having a first capacitance, the input element 204a of the index finger 204 may include a capacitor having a second capacitance, the input element 206a of the middle finger 206 may include a capacitor having a third capacitance, and so on. The capacitance of the input elements 116 changes as a result of a user applying pressure thereto. The respective capacitance of pairs of capacitors of the input elements 116 changes as a result of the user pressing two input elements 116 together. The input device 112 may include circuitry that generates a signal having a particular electrical characteristic as a result of a change in a pair of capacitors of the input elements 116.

In some embodiments, one or more of the input elements 116 are pressure sensitive switches that transition between an open state and a closed state as a result of pressure being applied thereto. The input device 112 in such embodiments may include circuitry that generates a signal having a particular electrical characteristic as a result of one or more switches transitioning between the open state and the closed state. Further description of such circuitry is described below.

The input device 112 may include a first power receiving portion 212 and/or a second power receiving portion 214 through which power may be wirelessly transferred from a ski pole 120 to the input device 112. The first power receiving portion 212 is located on a palm portion of the input device 112 for wirelessly receiving power from a corresponding power provisioning portion in the grip of the ski pole 120. The second power receiving portion 214 is located on or near a wrist portion of the input device for receiving power from a corresponding power provisioning portion in the wrist strap of the ski pole 120. The second power receiving portion 214 may wrap partially or entirely around the wrist portion. The first power receiving portion 212 and the second power receiving portion 212 may include inductive coils that generate current as a result of a magnetic field passing therethrough. The first power receiving portion 212 and the second power receiving portion 214 may wirelessly receive power based on principles of inductive coupling and/or magnetic resonance coupling. The first power receiving portion 212 and the second power receiving portion 214 may be embedded, woven, or otherwise integrated into the textile material of the body 114 of the input device 112.

Figure 2B:
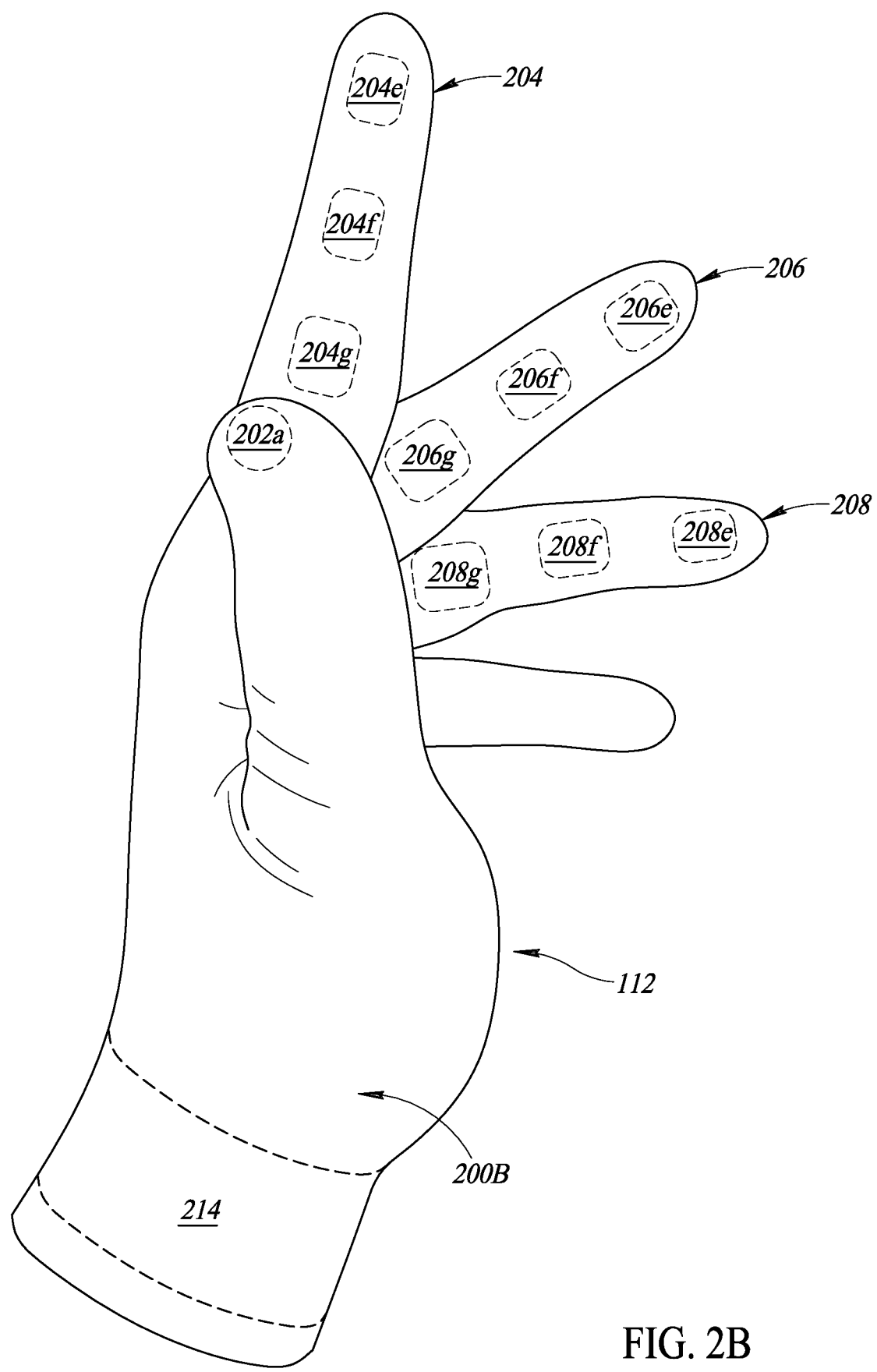
FIG. 2B illustrates a second plan view of the hand-worn input device of FIG. 2A.

FIG. 2B shows a view of a radial portion 200B of the input device 112 according to one or more embodiments. The input device 112 may include a set of input elements 116 provided on a radial side of one of more of the fingers 204, 206, 208, 210. The index finger 204 may include one or more input elements 204e through 204g located along a length of the index finger 204 on the radial side. The middle finger 206 similarly may include one or more input elements 206e through 206g located along a length of the middle finger 206 on the radial side. The ring finger 208 may include one or more input elements 208e through 208g located along a length of the ring finger 208 on the radial side. Although not shown, the little finger 210 may also include one or more input elements located on a radial side thereof. The input elements 116 located on the radial side of the fingers 204, 206, 208, 210 may be elements having a structure and operation similar to the input elements 116 of the palm-side 200A of the input device 112. The second power receiving portion 214 may wrap around the radial portion 200B of the input device 112.

Figure 2C:
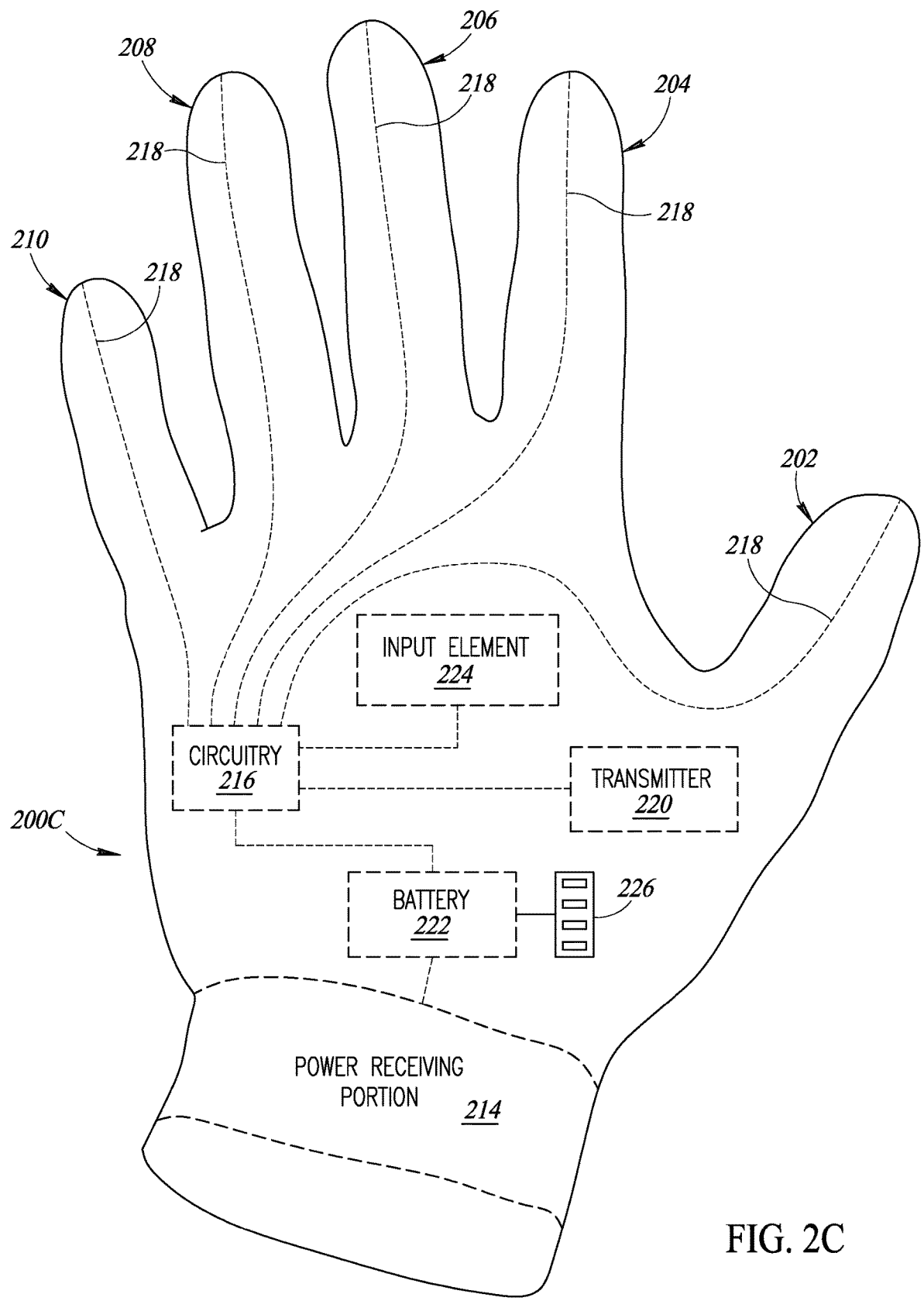
FIG. 2C illustrates a third plan view of the hand-worn input device of FIG. 2A.

FIG. 2C shows a view of a dorsum or back portion 200c of the input device 112 according to one or more embodiments. The input device 112 includes circuitry 216 for detecting interactions between pairs of the input elements 116. The input elements 116 may be electrically coupled to the circuitry 216 via a set of conductors 218 in the body 114. The input device 112 of the current embodiment includes a transmitter 220 for transmitting input signals to the HUD unit 102 corresponding to interactions involving one or more input elements 116. The input signals may be transmitted to the HUD unit 102 wirelessly or via a wired connection depending on the embodiment. The circuitry 216 causes the transmitter 220 to transmit the input signal(s) to the HUD unit 102 as a result of detecting interaction between input elements 116.

The input device 112 may include a battery 222 that stores and provides power to other portions of the input device 112, including the circuitry 216 and the transmitter 220. The battery 222 may be charged by power received from a battery in the ski pole 120 via the first power receiving portion 214 and/or the second power receiving portion 216. The input device 112 may include a port (not shown), such as a universal serial bus (USB) port, electrically coupled to the battery 222, through which the battery may be charged. In some embodiments, the battery 222 may be charged by capturing electric energy generated by the triboelectric effect, as described below in further detail. The battery 222 may have a thin thickness that does not interfere with user activity or cause discomfort to the user. The battery 222 may comprise a plurality of smaller batteries distributed throughout the body 114. The input device 112 may include a battery charge indicator 226 electrically coupled to the battery 222 that indicates a current level of charge of the battery 222.

The input device 112 may further include one or more input elements 224 provided on the back portion 200c. The one or more input elements 224 may be touch sensor elements or pressure sensitive switches similar to those described with respect to the input elements 116 above. The one or more input elements 224 are also electrically coupled to the circuitry 216 and integrated into the body 114 in a manner similar to the input elements 116. The one or more input elements 224 may have a larger surface area than the input elements 116 in some embodiments. In some embodiments, an input element 224 located on the back portion 200c may be a track pad that generates signals representative of a location of a user's finger on the track pad. In such embodiments, the input device 112 may transmit input signals to the HUD unit 102 for navigating user interfaces displayed by the virtual image display unit 110, as described herein. Further discussion regarding the circuitry is described below with respect to FIGS. 5 and 6.

Figure 3:
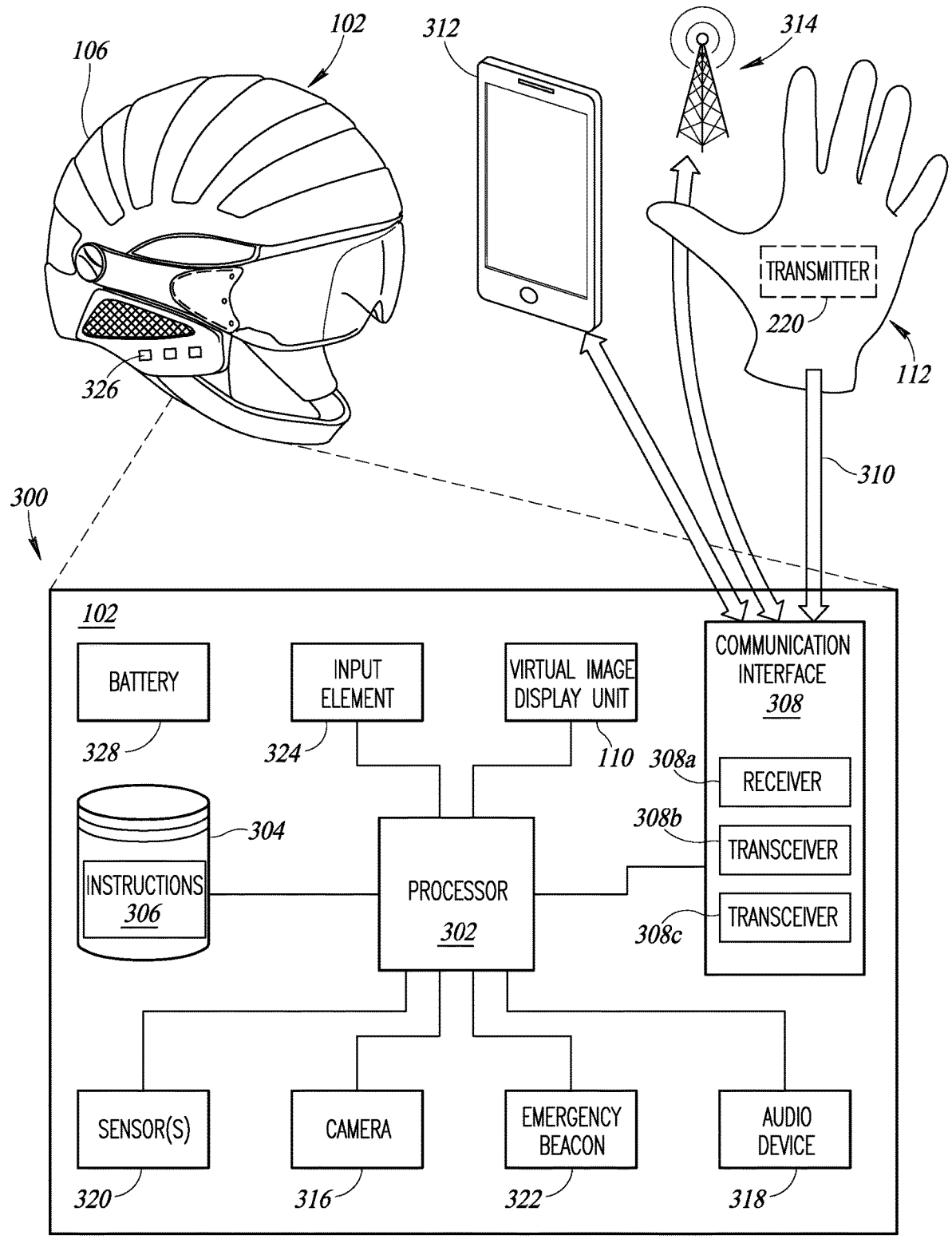
FIG. 3 illustrates a block diagram of a head-mounted heads-up display unit of the heads-up display system of FIG. 1.

FIG. 3 shows a block diagram 300 of the HUD unit 102 according to one or more embodiments. The HUD unit 102 may include all or some of the elements described and depicted in the block diagram 300. The HUD unit 102 includes the virtual image display unit 110 and one or more processors 302 electrically coupled with the virtual image display unit 110 for controlling one or more operations thereof. The one or more processors 302 may include microprocessors, field programmable gate arrays (FPGAs), application-specific integrated circuits (ASICs), or other hardware having arrays of logic elements. The HUD unit 102 may also include memory 304 electrically coupled to the one or more processors 302 and storing a set of instructions 306 that, as a result of execution by the one or more processors 302, cause the HUD unit 102 to perform as described herein. The memory 302 includes read-only memory (ROM) and random access memory (RAM), such as solid-state memory, hard disk memory, dynamic RAM, static RAM, or other forms of memory. The one or more processors 302 and memory 304 may be part of a control unit that controls the virtual image display unit 110 and/or other parts of the HUD unit 102.

The HUD unit 102 also includes a communication interface 308 comprising one or more communication devices. The communication interface includes a receiver 308a for receiving input signals 310 from the transmitter 220 of the input device 112. The receiver 308a may receive input signals according to one or more communication protocols, such as a Bluetooth™, ZigBee™, Z-Wave, Near Field Communication, cellular mobile communication protocols (e.g., 4G, 5G) or other internet of things or wireless network protocols. In some embodiments, where the input device 112 is communicatively coupled to the HUD unit 102 using a wired connection, the receiver 308a may include a port or an interface for establishing the wired connection.

In some embodiments, the communication interface 308 may further include a transceiver 308b for communicating with other processor-based devices 312, such as a user's mobile device, or network devices 314, such as a network router or cellular network antenna. The transceiver 308b may include one or more of a Wi-Fi transceiver, a Bluetooth™ transceiver, a ZigBee™ transceiver, a near-field communication transceiver, a cellular transceiver, or other similar wireless transceivers. The HUD unit 102 may be operable to obtain data related to a local recreational outdoor area, such as a ski resort, using the transceiver 308b. The communication interface 308 may include a port, such as a USB port, for communicatively coupling a processor-based device, such as a user's cellular phone, to the HUD unit 102.

In some embodiments, the communication interface 308 may include a transceiver 308c for communicating with users of other HUD units local to the HUD unit 102. The transceiver 308c may include a radio transceiver for sending and receiving communications over certain frequency bands. The transceiver 308c may be sufficiently powerful to send and receive communications to and from other HUD units not within a line of sight of the HUD unit 102, but which are located within the same recreational outdoor area.

Groups of HUD systems 100 may link or pair together with each other to allow communications between them while in recreational outdoor areas. The transceiver 308c may send and receive private communications, over a network of the recreational outdoor area, to a selected group of HUD units, such as HUD units of friends and family. For instance, the transceiver 308c may send communications having information indicative of a set of users that will receive the communications, or may encrypt transmitted communications using a private key held by a set of HUD units. The set of HUDs may exchange information that can be used later in connection with sending and receiving communications to identify or process communications intended between some or all of the set of HUDs. In essence, the transceiver 308c allows a user to send and receive local communications to a selected group of people to coordinate while in or around the outdoor recreational area without involving secondary cellular mobile devices, tablets, etc. The communication interface 308 may also include a global positioning system (GPS) receiver for receiving position information provided by a GPS satellite.

In some instances, authorized HUD systems 100 may communicate with any HUD system 100 in or around the outdoor recreational area without previously pairing or exchanging cryptographic information with the other HUD systems 100. For example, ski patrol members equipped with an authorized HUD system 100 may selectively communicate with or obtain location information from HUD systems 100 of guests in the outdoor recreational area without pairing with the guest HUD systems 100. The guest HUD systems 100 may be automatically registered for communications with the authorized HUD system 100 upon joining a local network of the outdoor recreational area. This may allow ski patrol and rescue crews to locate and/or communicate with injured, lost, or trapped guests via the HUD system 100. The authorized HUD system 100 may send alerts or notifications to the HUD systems 100 regarding unsafe areas, unsafe conditions, closures, etc.

The HUD unit 102 may include one or more peripheral devices providing additional functionality. In some embodiments, the HUD unit 102 may include a camera 316 for capturing image data. The image data may be selectively captured and stored in the memory 304 in response to user input. The processor 302, in some instances, may selectively cause the camera 316 to capture image data, which the processor 302 may then process to make various determinations, such as a determination of whether the HUD unit 102 is in motion.

In some embodiments, the HUD unit 102 may include one or more audio devices 318 for generating or capturing sound. The audio devices 318 may include a microphone coupled to the processor 302 or other part of the HUD unit 102, and positioned in the body 114 of the HUD unit 102 for generating a signal corresponding to the user's voice. The processor 302 may cause information representative of the user's voice to be selectively transmitted via the communication interface 308. The audio devices 318 may include one or more speakers coupled to the processor 302 or other part of the HUD unit 102, and positioned in the body 114 of the HUD unit 102 at a location at or near where a user's ear would be when the HUD unit 102 is worn. The processor 302 may cause the speaker to selectively generate sound, such as a communication from another HUD unit 102. The HUD unit 102 may play music or other audio stored in the memory 304 or streamed via the communication interface 308. Other peripheral devices, such as a flashlight, may be included in the HUD unit 102.

The HUD unit 102 may include one or more sensors 320 for sensing physical and environmental properties experienced by the HUD unit 102. The sensors 320 may be located in, or be at least partially exposed on, a surface of the body 114. The one or more sensors 320 may be electrically communicatively coupled to the processor 302 for providing measurements to the processor 302. The one or more sensors 320 may include one or more accelerometers for detecting acceleration of the HUD unit 102. For instance, in response to a user beginning to accelerate down a ski slope, the accelerometer(s) may generate signals representative of the acceleration at various points along the slope. As another example, the accelerometer may generate a signal representative of sudden deceleration, sudden acceleration, or unusual changes in direction. The accelerometer(s) may be oriented or configured to detect acceleration along multiple axes (e.g., x-axis, y-axis, z-axis) and in different coordinate systems (e.g., polar, Cartesian), and provide measurements to the processor 302.

Further examples of the one or more sensors 320 may include a temperature sensor for detecting ambient temperature, a wind sensor for detecting wind speed and/or direction, a barometer or altimeter for detecting an altitude of the HUD unit 102, and a photodetector for detecting an ambient light level. The instructions 306 may cause the processor 302 to perform various operations in response to receiving measurements from the one or more sensors 302. For instance, the processor 302 may perform a set of operations specified in the instructions 306 as a result of receiving a set of measurements corresponding to a set of conditions defined in the instructions 306. Signal conditioning circuitry may be associated with some or all of the sensors 320 for conditioning the measurement signals into an appropriate format, scale, etc., such as converting a measurement signal from an analog signal into a digital signal.

The HUD unit 102 may further include an emergency locator beacon or transponder 322 for generating a signal (e.g., radio frequency signal) having a set of characteristics indicating that the user of the HUD unit 102 may be experiencing an emergency, such as being injured in a fall or trapped in an avalanche. The emergency beacon 322 may be a standard beacon that transmits an emergency signal in one or more radio frequency bands. In some implementations, the emergency beacon 322 may transmit location data representative of a location of the HUD unit 102 based on GPS data received via the communication interface 308. In some embodiments, in connection with activation of the emergency beacon 322, the processor 302 may send the location information over a network (e.g., a cellular network of the outdoor recreational area) to an emergency response entity in association with a communication indicating an emergency.

The emergency beacon 322 may be activated as a result of receiving a user input command for activating the emergency beacon 322, or automatically without user interaction as a result of the processor 302 receiving measurements from the one or more sensors 320 corresponding to a set of conditions defined in the set of instructions 306 for activating the emergency beacon 322. The defined set of conditions may be, for example, a rapid deceleration measurement by one or more accelerometers exceeding a predetermined threshold, which may be indicative of the user falling or running into a tree. As another example, the defined set of conditions may be a sudden change in ambient light measurement by a photodetector in connection with a rapid deceleration measurement, which may be indicative of the user being trapped in an avalanche.

The HUD unit 102 may include one or more input elements 324 electrically communicatively coupled to the processor 302 for providing user input to the HUD unit 102 directly. The one or more input elements 324 are provided on an outer portion of the body 114 and may correspond to buttons, switches, dials, or other electromechanical input device 326 for receiving user input. In some embodiments, the input elements 324 may be coupled to peripheral elements, such as to the audio elements 318 for controlling playback or volume thereof. The instructions 306 may cause the processor 302 to perform one or more operations in response to receiving an input signal from an input element 324. Input from an input element 324 may, for instance, cause the processor 302 to selectively activate or deactivate the virtual input display unit 110. In response to receiving input from an input element 324, the processor 302 may cause the virtual image display unit 110 to display or cease display of virtual image content to a user. The processor 302, responsive to a first input from the input element 324, may cause the virtual image display unit 110 to present a user interface in the user's field of view via the display 104. Responsive to a second input from the input element 324 subsequent to the first input, the processor 302 may cause the virtual image display unit 110 to cease display of the user interface.

In some embodiments, the processor 302 may transmit a signal to the input device 112 in response to receiving an input from an input element 324. In such embodiments, the receiver 308a may instead be a transceiver, and transmitter 220 may instead be a transceiver for communicating with the transceiver of the input unit 112. In response to receiving the input from the input element 324, the HUD unit 102 may transmit a signal to the input device 112 causing the input device 112 to transition from a first state to a second state. For instance, the input device 112 may be maintained in a low power "sleep" state in which the circuitry 216 and/or input elements 116 are not powered, or the transmitter 220 does not transmit input signals to the HUD unit 102.

As a result of receiving a particular signal from the HUD unit 102, the input device 112 may transition from the sleep state to an active state in which interactions involving the input elements 116 cause the input device 112 to transmit corresponding input signals to the HUD unit 102. Conversely, in response to receiving a particular signal from the HUD unit 102 while the input device 112 is in the active state, the input device 112 may transition back to the sleep state. Advantageously, communication between the HUD unit 102 and the input device 112 may enable conservation of power stored in the battery 222. In some embodiments, the processor 302 and transmitter 220 may be operable to selectively pair or unpair the input unit 112 and HUD unit 102 with each other. In some embodiments, the processor 302 may communicate with the input device 112 to determine a location of the input unit 112, such as by causing the input device 112 to emit a sound or light, or by obtaining location information from the input unit 112 indicating a location of the input unit 112.

The HUD unit 102 also includes a battery 328 disposed in the helmet body 106. The battery 328 may power the HUD unit 102 and the parts thereof. The battery 328 may be coupled to a port (e.g., USB port) on the HUD unit 102 for receiving power to charge the battery 328. The helmet body 106 may include an indicator electrically coupled to the battery 328 that indicates a charge level of the battery 328. The indicator may be visible on an exterior of the helmet body 106, such as in a location adjacent to the one of more electromechanical input devices 326, so that a charge level of the HUD unit 102 can be determined without having to activate the virtual image display unit 110.

Figure 4A:
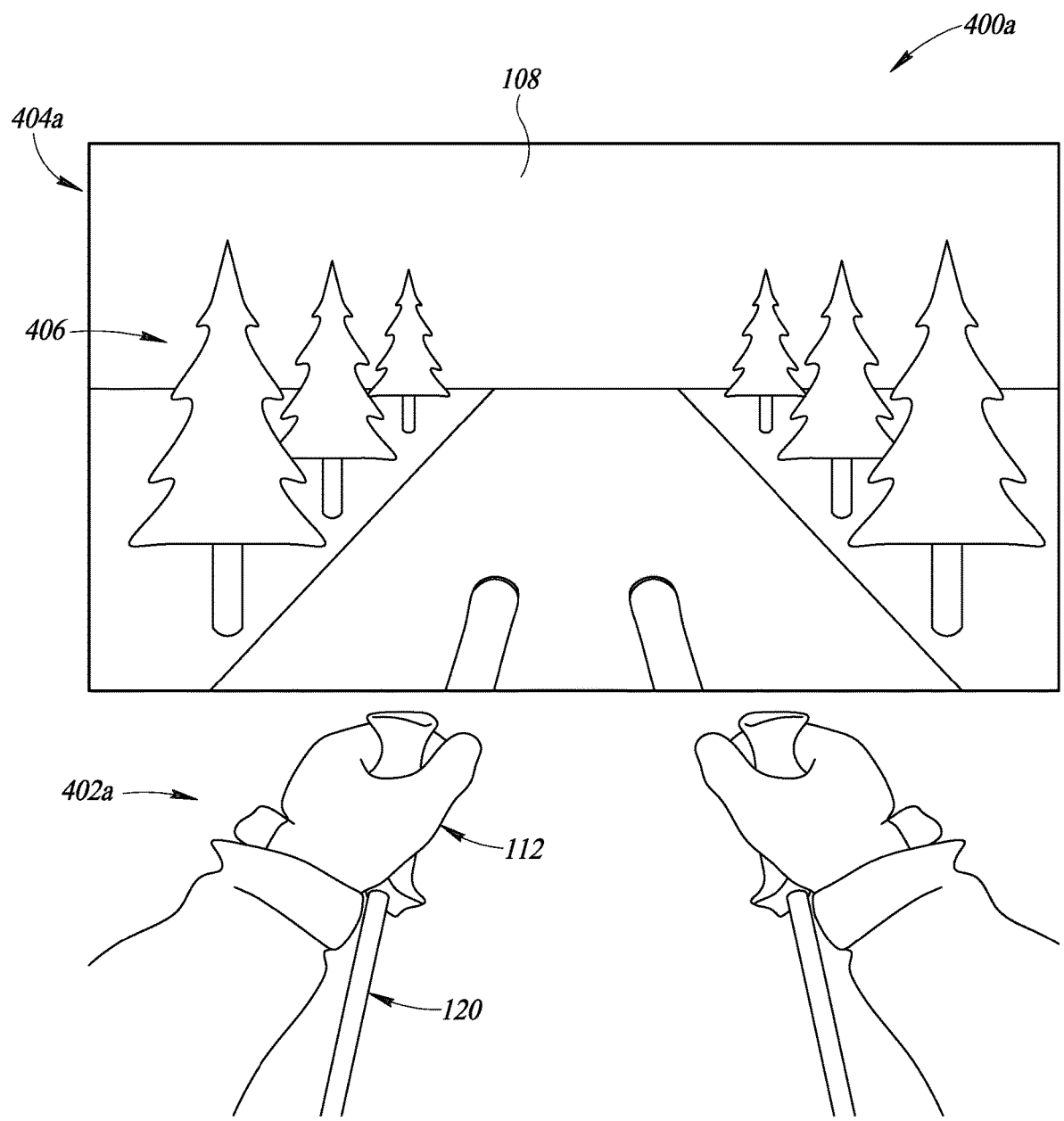
FIG. 4A illustrates a first environment in which a field of view of the heads-up display unit is shown relative to a first state of one or more hand-worn input units.

FIGS. 4A through 4E illustrate exemplary environments in which a user's field of view is shown relative to a state of input units 112 worn by the user at a particular time. FIG. 4A shows an environment 400a in which a user's field of view 404a is displayed relative to a state 402a of the input devices 112. In the environment 400a, the user is actively skiing down a slope at a first time with the input devices 112 gripping the ski poles 120. The virtual image display unit 110 is not causing virtual image content in the field of view 404a. Accordingly, the field of view 404a of the user is of external scenery 406 viewed through the transparent lens 108 and the user's view is unobstructed by the virtual image content. The processor 302 may cause the virtual image display unit 110 to transition to the mode shown in the field of view 404a automatically as a result of receiving measurements from one or more of the sensors 320 indicating movement or receiving particular signals described herein. Movement of the HUD unit 102 may be determined as a result of processing visual data from the camera 316, receiving a signal from an accelerometer in the HUD unit 102 exceeding a certain threshold, or receiving a measurement from a wind sensor exceeding a certain threshold, or a combination thereof. In addition, the user may perform the interaction in 402b whereby all virtual image content is removed, reverting the user's view back to the field of view 400a.

Figure 4B:
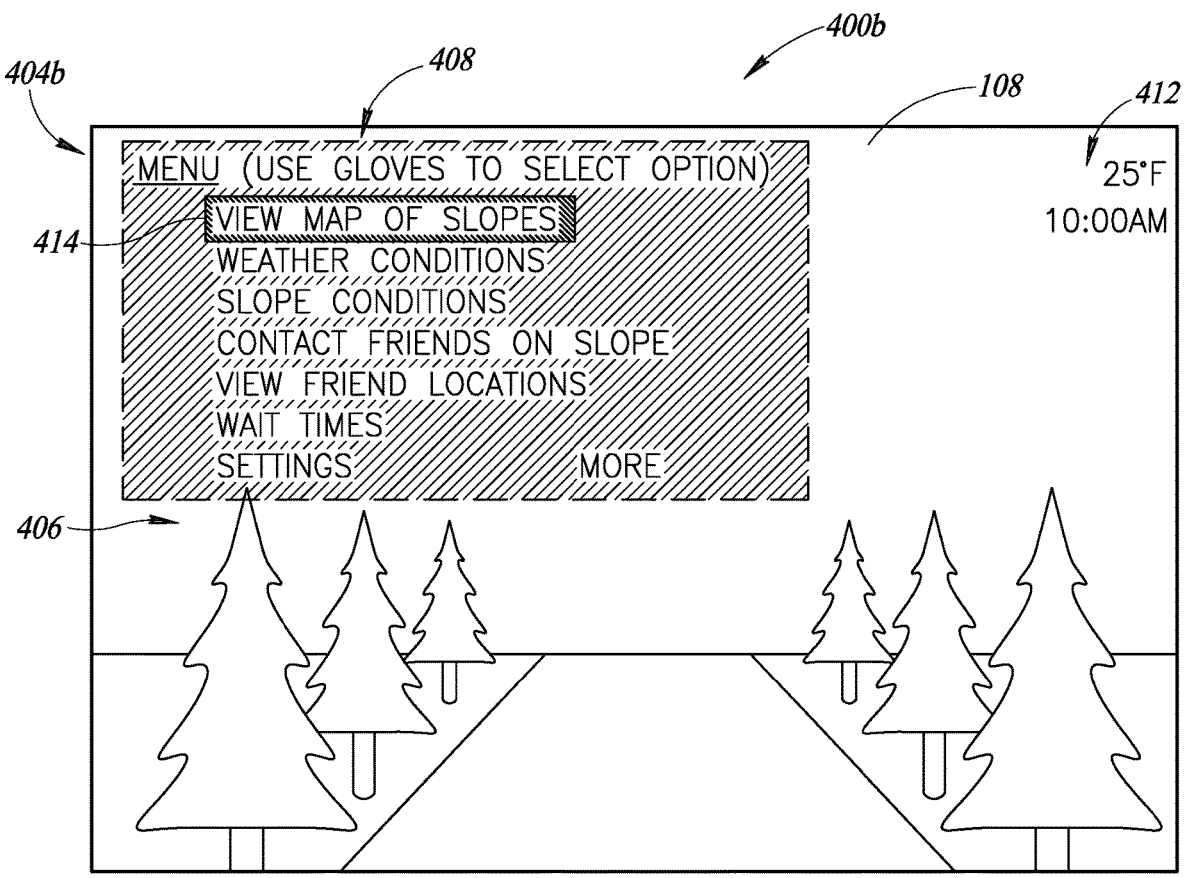
FIG. 4B illustrates a second environment in which a field of view of the heads-up display unit is shown relative to a second state of one or more hand-worn input units.
Figure 4B:
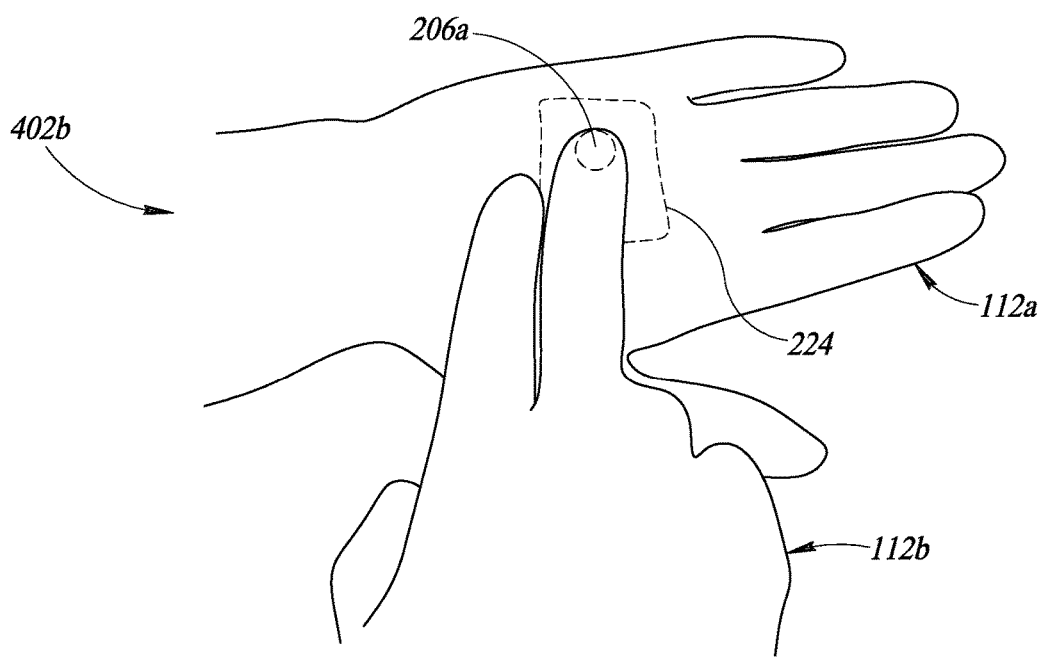

FIG. 4B shows an environment 400b in which a user's field of view 404b is displayed relative to a state 404b of the input device(s) 112. In the environment 400b, the user is stopped, and not actively skiing down the slope. The state 402b of the input devices 112 is one in which the user is performing an interaction causing the virtual image display unit 110 to transition from a first state in which virtual image content is not displayed (as seen in the field of view 400a) to a second state in which virtual image content is displayed in the field of view 404b. In this embodiment, the interaction is one in which a user interacts with the input element 224 located on the back portion 200c of an input device 112a by pressing or touching the input element 224 with an appendage of the other hand. The input element 224 may be a touch sensitive device/sensor or pressure sensitive element that, when pressed or touched, causes the input device 112a to send an input signal corresponding to the interaction with the input element 224. In this embodiment, the second input device 112b is not strictly necessary—the input device 112a may, for instance, be a glove liner worn under another glove or mitten, and may send the appropriate input signals without the second input device 112b. In some embodiments, interaction with the input element 224 may cause the input unit 112 to transition between a sleep state and an active state.

In some embodiments, the interaction may be an interaction of an input element 116 of the second input device 112b with the input element 224 of the first input device 112b. The interaction may be one in which the input element 224 is positioned in proximity to an input element on the tip portion of a finger of the second input device 112b (e.g., input element 206a). The interaction between the conductive plates causes one or both of the input devices 112a and 112b to send an input signal corresponding to the interaction.

The HUD unit 102, as a result of receiving the input signal, causes the virtual image display unit 110 to transition from the first state, in which virtual image content is not displayed, to the second state, in which virtual image content is displayed. The processor 302, for example, may receive the input signal and access data or instructions 306 in the memory 304 indicating one or more operations to be performed in response to the particular input signal. The data may be in the form of a look-up table or other appropriate data structure in which an identifier or value of the input signal is associated in memory with a corresponding operation to be performed as a result of receiving the input signal. The virtual image content displayed in the field of view 404b is a user interface 408 comprising a set of selectable interface elements 410. The interface elements 410 are representative of data objects stored in the memory 304 and/or a set of the instructions 306. The user interface 408 may also include a selection indicator 414 indicating a currently selected one or ones of the interface elements 410. As a result of user selection of the interface elements 410, the processor 302 may access the corresponding data object(s) and/or execute the corresponding set of the instructions 306.

In the field of view 404b, the user perceives the user interface 408 and the external scenery 406 through the transparent lens 108 at the same time. The interaction with the input element 224 may be repeated, or a different interaction may be performed, to selectively transition the virtual image display unit 110 back to the first state of the environment 400a. The interaction causing the virtual image display device 110 to display virtual image content is performed in such a manner that it is unlikely that a user will perform the interaction while actively skiing. In particular, the user performs the interaction with the input element 224 with an appendage of the other hand, so it is unlikely that a user will interact with the input element 224 accidentally or while gripping a ski pole 120. The HUD unit 102 may be configured to prevent display of the virtual image content if it is detected that the user is in motion or moving at a speed exceeding a predetermined threshold.

In some embodiments, the set of instructions 306 may include restrictions and associated conditions that, if detected, cause the processor to prevent the virtual image display unit 110 from displaying virtual image content in conditions where the virtual image display unit 110 would otherwise display the virtual image content. For instance, one or more of the processor(s) 302 may obtain image content captured by the camera 316, and process the captured image content to determine whether certain motion conditions specified in the instructions 306 are satisfied. As a result of the processor 302 determining that the motion associated with the HUD unit 102 satisfies the motion conditions, the processor 302 may restrict or prevent the virtual image display unit 110 from displaying virtual image content even though an input signal corresponding to a particular interaction was received (e.g., the interaction of the state 402b). In some embodiments, the processor 302 may cause the virtual image display unit 110 to discontinue display of the virtual image content as a result of determining that one or more restriction conditions are satisfied. The processor 302 may cause the virtual image display unit 110 to discontinue display of the user interface 408 as a result of failing to receive an input signal from the input device 112 in a given period of time.

In some embodiments, a different interaction than the one with the input element 224 may cause the processor 302 to receive an input signal for displaying the virtual image content. An interaction with the input element 324 on the HUD unit 102 may cause an input signal to be sent to the processor 302 for transitioning the virtual image display unit 110 between the first state and the second state. As another example, the interaction may instead be a series of interactions between pairs of input elements 116 performed in a certain sequence within a given period of time.

The virtual image content provided by the virtual image display unit 110 may include image content other than the user interface 408. For instance, the virtual image content displayed may include information 412 indicative of weather conditions, time, date, location, etc. Settings of the HUD unit 102 may be modified to cause persistent display of the information 412, or may be modified to selectively display or cease display of the information 412 in connection with receiving an input signal from the input device 112.

The information 412 displayed may include other information, such as an indication of a charge level of the battery 328 of the HUD unit 102 and/or the input device(s) 112. The input devices 112, for instance, may respectively transmit information indicating a charge level of the battery 222 of the input device 112. The HUD unit 102 may selectively display a representation indicating a charge level of the battery 222 of an input device 112 worn on a right hand of the user, a charge level of the battery 222 of an input device 112 worn on the left hand of the user, and/or a charge level of the battery 328 of the HUD unit 102.

Figure 4C:
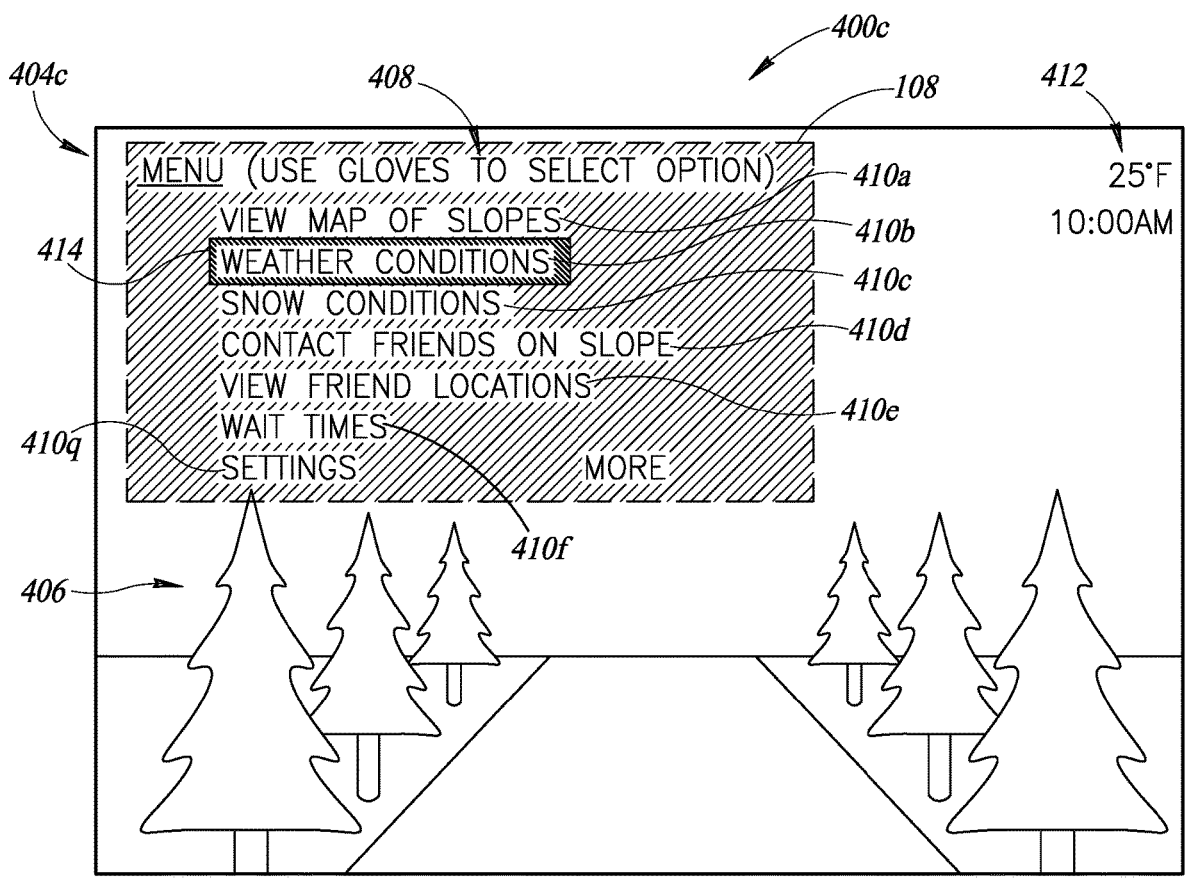
FIG. 4C illustrates a third environment in which a field of view of the heads-up display unit is shown relative to a third state of one or more hand-worn input units.
Figure 4C:
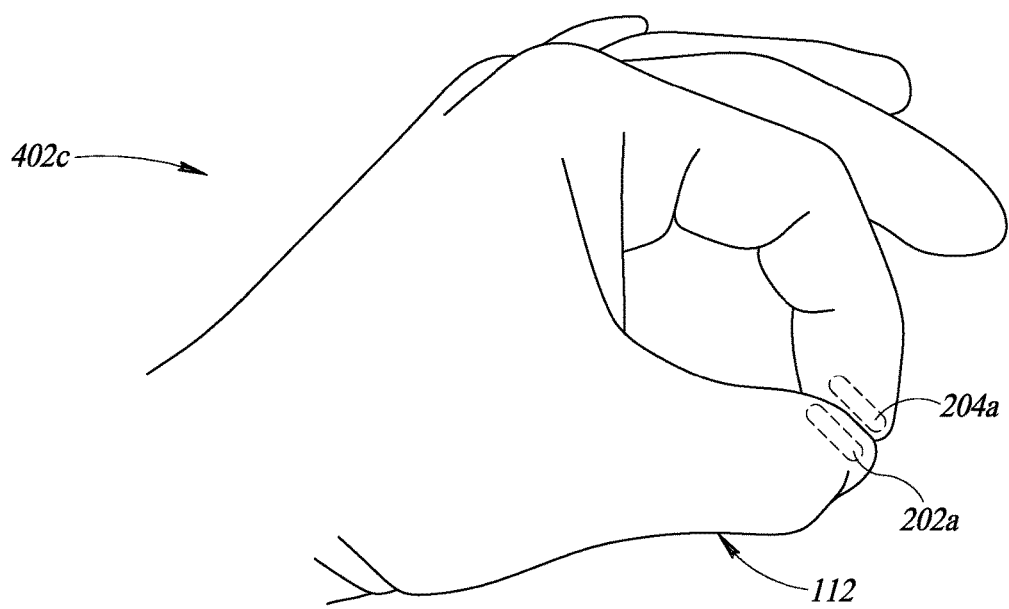

FIG. 4C shows an environment 400c in which a user's field of view 404c is displayed relative to a state 402c of the input device 112. The state 402c of the input device 112 is one in which the user is performing an interaction causing an update to the virtual image content presented by the virtual image display unit 110. In particular, the interaction is between a pair of input elements of the input device 112. In some embodiments, the interaction is one in which the input element 202a in the tip portion of the thumb 202 interacts with another input element of the input device 112—for example, an interaction of the input element 202a with the input element 204a in the tip portion of the index finger 204. The interaction corresponding to the state 402c causes the input device 112 to send a corresponding input signal to the HUD unit 102.

As a result of receiving the input signal, the processor 302 may access data or instructions in the memory 304 to determine which, if any, operations should be performed in response. In response to the input signal corresponding to the interaction of the state 402c, the processor 302 causes the virtual image display unit 110 to update the virtual image content displayed. For instance, in the field of view 404c, a position of the indicator 414 is updated indicating that a second interface element 410b is currently selected instead of the first interface element 410, which was indicated as being currently selected in the field of view 404b. The instructions 306 cause the processor 302 to store interface state data in the memory 304 representative of the current state of the user interface 408.

Other interactions between pairs of the input elements 116 may cause other updates to the virtual image content presented. For instance, an interaction between the input element 202a and the input element 206a of the tip portion of the ring finger 206 may cause the input device 112 to transmit an input signal causing the processor 302 to update the currently selected interface element back to the first interface element 410c. As another example, an interaction between the input element 202a and the input element 204e on the radial portion of the index finger 204 may cause the processor 302 to update the currently selected interface element in a rightward direction to select the interface element 410g corresponding to a settings interface element. Interactions between other pairs of the input elements 116 other than the input elements 202a and 204a may cause the processor 302 to update to the virtual image content displayed.

Figure 4D:
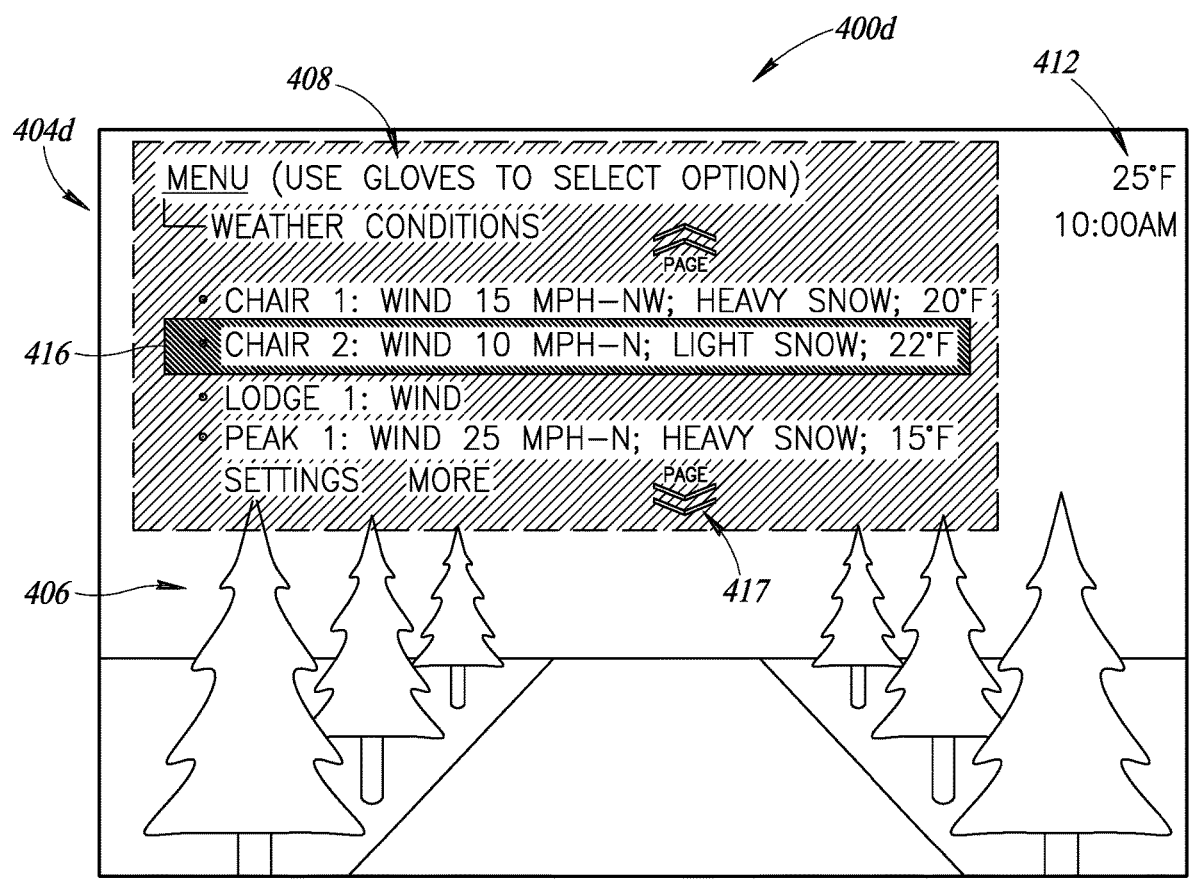
FIG. 4D illustrates a fourth environment in which a field of view of the heads-up display unit is shown relative to a fourth state of one or more hand-worn input units.
Figure 4D:
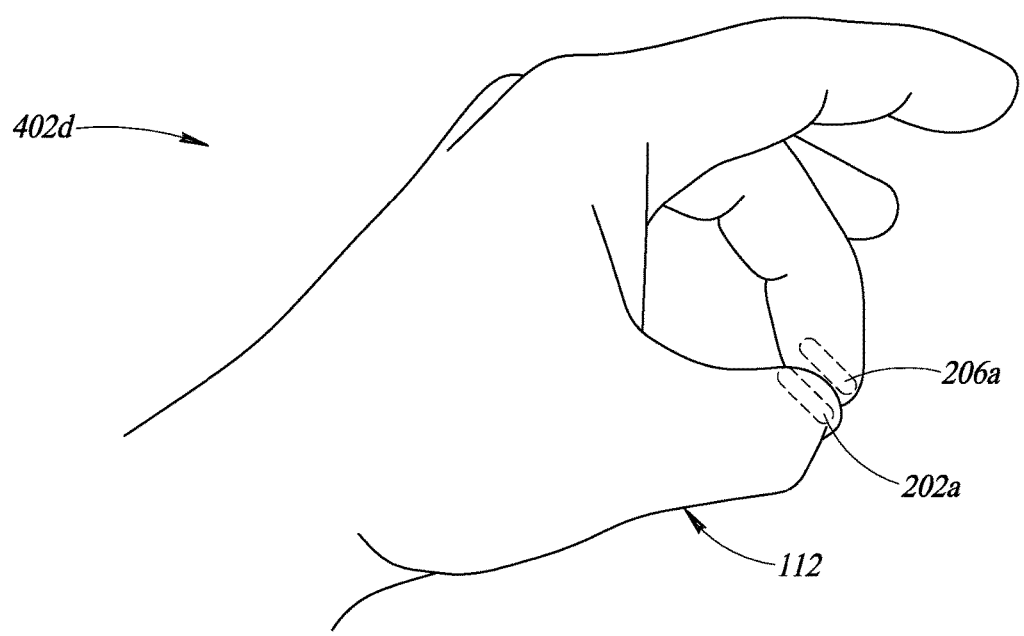

FIG. 4D shows an environment 400d in which a user's field of view 400d is displayed relative to a state 402d of the input device 112. The state 402d of the input device 112 is one in which the user is performing an interaction causing selection of virtual image content presented by the virtual image display unit 110. The interaction of the state 402d is between a second pair of input elements 116 of the input device. The interaction depicted in the environment 400d is between the input element 202a of the tip portion of the thumb 202 and the input element 206a of the middle finger. However, interactions between other pairs of input elements 116 may cause the processor 302 to select a currently selected interface element 410, which may be representative of an associated set of data objects and/or an associated set of operations. The interaction of the state 404d causes the input device 112 to send a corresponding input signal to the HUD unit 102.

As a result of receiving the corresponding input signal from the input device 112, the processor 302 may access data or instructions in the memory 304 to determine which, if any, operations should be performed in response. The input signal corresponding to the interaction of the state 402d causes the processor 302 to execute instructions for selecting the currently selected interface element 410b indicated in the environment 400c. In connection with selection of the interface element 410b, which is an option to obtain current weather conditions, the processor 302 performs a set of operations corresponding to the instructions executed for obtaining weather information indicating the current weather conditions at the recreational outdoor area in which the HUD unit 102 is located. The processor 302 sends, over a network via the communication interface 308, a request to obtain the weather information. The request may include information specifying the recreational outdoor area, or a location therein, in which the HUD unit 102 is located. The request is received by a remote server or other such processor-based device, which obtains and sends the requested weather information back to the HUD unit 102. The weather information may be provided to the remote server from network-connected sensors located at various locations throughout the recreational outdoor area.

The processor 302 receives the weather information and causes the virtual image display unit 110 to display virtual image content corresponding to the weather information. Specifically, the virtual image display unit 110 displays weather-related image content 416 indicating weather conditions reported at locations around the recreational outdoor area. The weather-related image content 416 may indicate weather conditions reported at chairlifts, peaks, runs, lodges, etc., around the recreational outdoor area. The weather-related image content 416 may indicate temperature, wind speed, wind direction, precipitation conditions, visibility, or other such information representative of weather conditions. The weather-related image content 416 may include meteorological information indicative of forecasted weather conditions at one or more locations in the recreational outdoor area along with having access to real-time radar information. The user may, via the input device 112, navigate the virtual image content displayed to obtain further details regarding conditions at locations in the recreational outdoor area.

The user interface 408 may include various interface elements 410 corresponding to operations and information other than those for accessing weather information. The user interface 408 includes, for example, an interface element 410a that is selectable for obtaining a map of the outdoor recreational area, as described below. An interface element 410c is selectable for obtaining information regarding snow conditions at locations around the outdoor recreational area. The information regarding snow conditions may include information regarding depth of snow, information regarding freshness of the snow (e.g., information indicating when or how much snow last fell or was generated at a location), information indicating whether a particular location or run has icy or powdery snow conditions, information indicating when snow at a location or run was last groomed, information indicating how much traffic a location or run is experiencing or has experienced throughout the day, or other information regarding conditions that may affect a user's enjoyment of a location or run due to snow conditions.

One or more of the interface elements of the user interface 408 may be for obtaining information about or communicating with particular persons located in the outdoor recreational area. One interface element 410d is selectable for contacting one or more persons in the outdoor recreational area. In particular, the user may select the interface element 410d to send a communication to person(s) in the outdoor recreational area that are known to the user, such as friends or family. As a result of selecting the interface element 410d, the processor 302 may obtain contact information from the memory 304 representative of a set of devices associated with persons known to the user. The contact information may include information that is useable to send the communication to a particular device—for instance, a frequency, a device identifier of a device associated with a person, or username (e.g., handle) associated with a person. Using the contact information, the user may interact with the input device 112 to send and receive communications to and from the selected contact.

The user interface 408 may include interface elements 410 for obtaining information regarding travel or weather external of the outdoor recreational area. For instance, the user interface 408 may include an option for obtaining traffic information regarding traffic conditions external to the outdoor recreational area, or weather conditions that may affect travel away from the outdoor recreational area.

As shown in the environment 400d, the user interface 408 may include navigation interface elements 417 for facilitating efficient navigation of the user interface 408. Non-limiting examples of such navigation interface elements 417 include elements for moving a scrolling directionally to display next elements of a list, page up or page down elements for displaying a plurality of next elements in a list, elements for moving directionally within a current view of the user interface 408, or shortcuts for accessing "favorite" interface elements.

In some embodiments, the communications may be communications using the transceiver 308c over a particular frequency or using one or more communication protocols. A user of the HUD unit 102 may exchange contact information with another person via the communication interface 308, and the contact information received may be stored in the memory 304. A group comprising two or more persons may, for example, congregate before skiing and initiate a defined operation in the set of instructions 306, via the user interface 408, to establish a private communication channel that the group of persons may communicate through while at the outdoor recreational area. The private communication channel may be a communication channel (e.g., frequency, cryptographic key, group identifier) assigned to the HUD units 102 of the persons of the group, by a remote server, that is unique to the group for the outdoor recreational area.

In some embodiments, the private communication channel is one in which communications between the members of the group using the HUD units 102 are inaccessible by devices not included in the group because they do not possess information regarding the contact information. As a result of exchanging the contact information, the members of the group may send and receive communications to and from each other within the outdoor recreational area using the transceiver 308c. As discussed above, authorized HUD systems 100 possessed by search and rescue personnel or ski patrol may selectively communicate with guest HUD systems 100 in the outdoor recreational area without previously pairing directly with the guest HUD systems 100.

Another interface element 410e is selectable for obtaining information indicating where certain persons are located within the outdoor recreational area. Selection of the 410e may cause the HUD unit 102 to send a request to another HUD unit 102 or mobile device within the outdoor recreational area to provide location information indicating where the other HUD unit 102 or mobile device is located within the outdoor recreational area. For instance, members of a group established according to the process described above may share location information with other members of the group so that members of the group can reconvene with each other if separated.

A further interface element 410f is selectable for obtaining information indicating wait times at various locations in the outdoor recreational area. Selection of the interface element 410f may initiate a submenu in which a user can select an interface element representative of a particular location, such as a chair lift, restaurant, lodge, etc., to obtain wait time information associated with the location indicating current time delays a user would have to wait to access resources at the location. Network-connected sensors at the locations may take current measurements that the sensors then report or otherwise provide to a remote server, which stores the wait time information to which the HUD unit 102 may selectively request access.

The user interface 408 may include other interface elements or be usable to access information or perform operations other than the interface elements depicted and described with respect to the environment 400c.

Figure 4E:
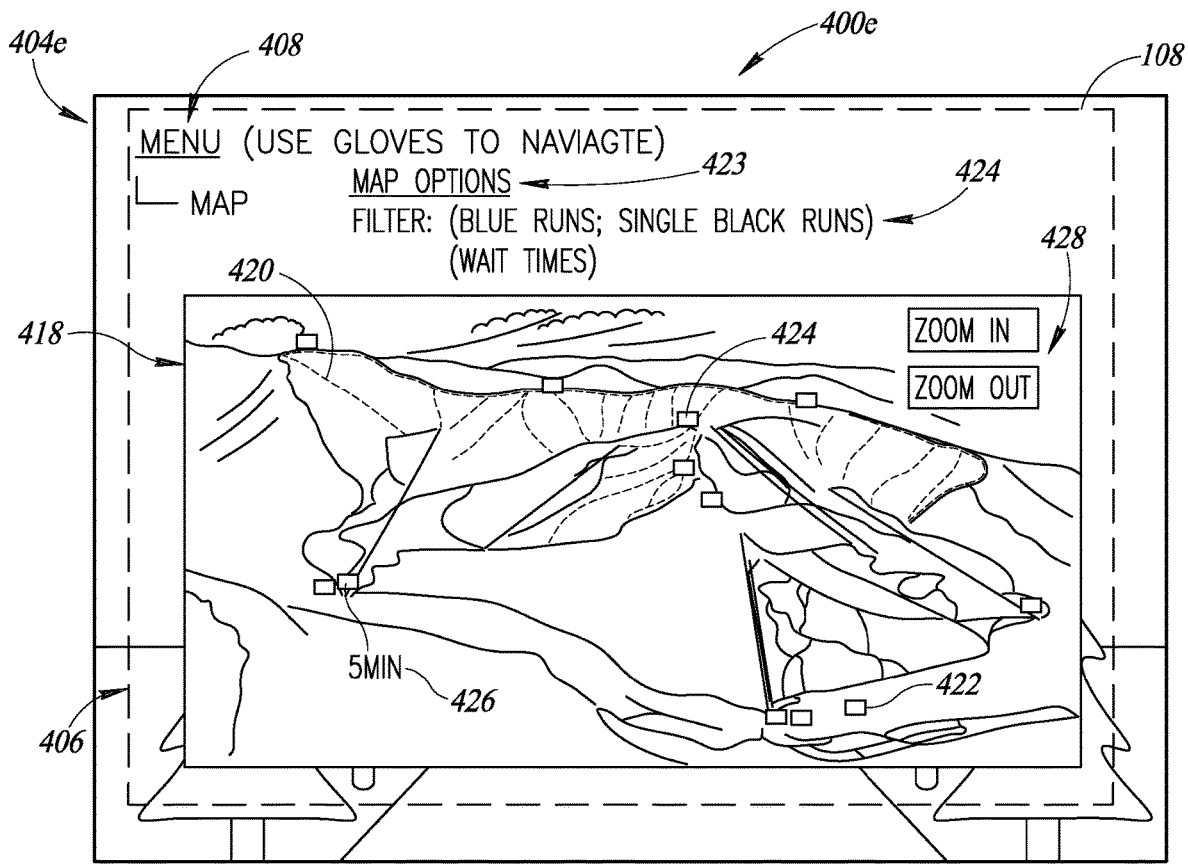
FIG. 4E illustrates a fifth environment in which a field of view of the heads-up display unit is shown relative to a fifth state of one or more hand-worn input units.
Figure 4E:
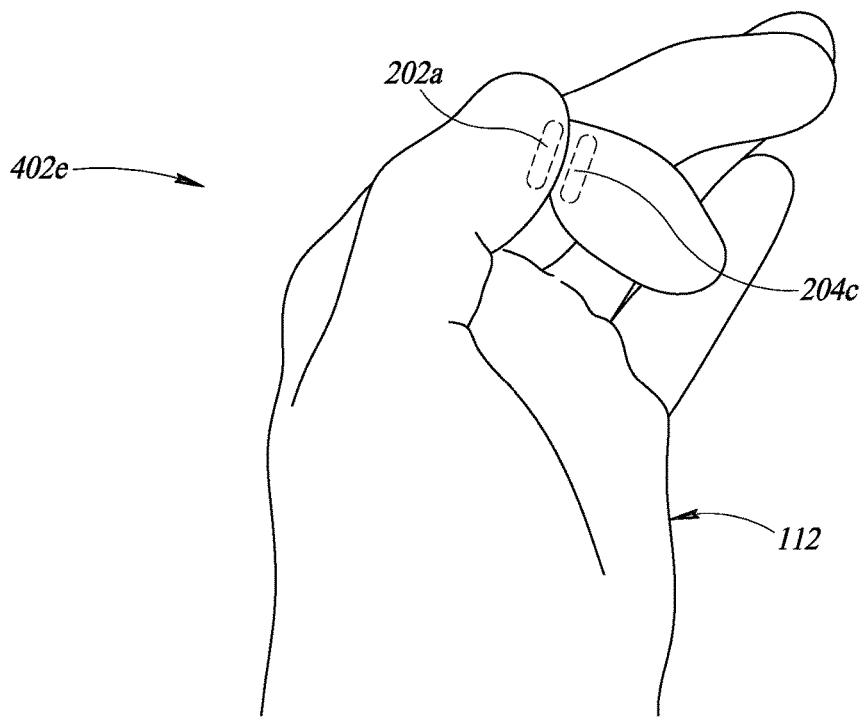

FIG. 4E shows an environment 400e in which a user's field of view 404e is displayed relative to a state 402e of the input device 112. The field of view 404e shows geographic image content 418 representative of the outdoor recreational area in which the HUD unit 102 is located. The geographic image content 418 may include features 420 representative of ski runs in the outdoor recreational area, features 422 representative of lodges or other buildings in the outdoor recreational area, or features 424 representative of medical assistance locations in the outdoor recreational area. The features 420, 422, and 424 in the geographic image content 418 are non-limiting examples of the myriad features that could be presented in the geographic image content 418.

The user may, via the input device 112, interact with at least some of the features in the geographic image content 418 to determine further information about the features. The user may perform interactions involving pairs of the input elements 116 to navigate, focus, zoom, and select features of the geographic image content 418. Selecting a feature 420 representative of a particular ski run may cause the processor 302 to obtain information about the run, such as difficulty, slope variances, conditions(e.g., moguls, ice, slush), historic information regarding when or if the user has previously traversed the run, and when the run was last groomed. Selecting the feature 420 representative of the run may also cause the visual image display unit 110 to provide additional options associated with the run, such as directions to the run (e.g., an order of lifts and runs to take to access the run). Selecting a feature 422 or 424 may also provide information regarding the associated location or options associated with the feature. For instance, selecting a feature 422 associated with a restaurant may cause the HUD unit 102 to obtain menu information, and selecting a feature 424 associated with a medical lodge may present an option for contacting personnel at the medical lodge. The geographic image content 418 and information regarding the features thereof may be obtained from a remote server and stored in the memory 304 as a result of a user establishing a connection with a remote server associated with the outdoor recreational area or requesting the information from the remote server. In embodiments in which the input element 224 is a track pad, the user may navigate the geographic image content 418 using the input element 224.

The user interface 408 may include options for interacting with or modifying a view of the geographic image content 418 or other interface content. The user interface 408 may include an options element 423 that can be accessed to modify the currently presented features of the geographic image content 418. The options element 423 may enable a user to filter or prevent certain features from being displayed as part of the geographic image content 418 based on characteristics of the features. For instance, via the options element 423, the user may select options causing a subset of the run features 420 to be displayed based on difficulty, conditions (e.g., iciness, moguls, wind, snow depth), skier density, etc. A filter element 424 of the field of view 404e indicates that only blue runs and black runs having less than a certain wait time to access are displayed. Via the options element 423, the user may control the geographic image content 418 to graphically indicate or represent wait times 426, skier density, or other useful information. A zoom element 428 may be provided to zoom in or out of particular areas of the geographic image content 418.

The HUD unit 102 may be configured to perform particular sets of operations in response to receiving a particular corresponding input signal. For instance, an interaction between a certain pair of the input elements 116 may cause the input device 112 to send a particular input signal. The processor 302 may, in response to receiving the particular input signal, perform a corresponding particular set of operations defined in the set of instructions 306. The memory 304 may include a lookup table or other referential data structures defining a corresponding set of operations to execute or otherwise perform in response to receiving a particular input signal.

In some embodiments, some associations between operations and input signals may be fixed, but other associations between operations and input signals may be capable of user modification so that a user can customize a desired action to be performed in response to a particular interaction involving the input elements 116. For instance, the state 402e of the input device is one in which the input element 202a is proximate to the input element 204c. The HUD unit 102 may be configured to perform a defined set of operations in response to receiving an input signal corresponding to the state 402e of the input device 112. The defined set of operations may cause the virtual image display device 110 to present the geographic image content 418 in response to receiving the input signal corresponding to the state 402e.

Figure 5:
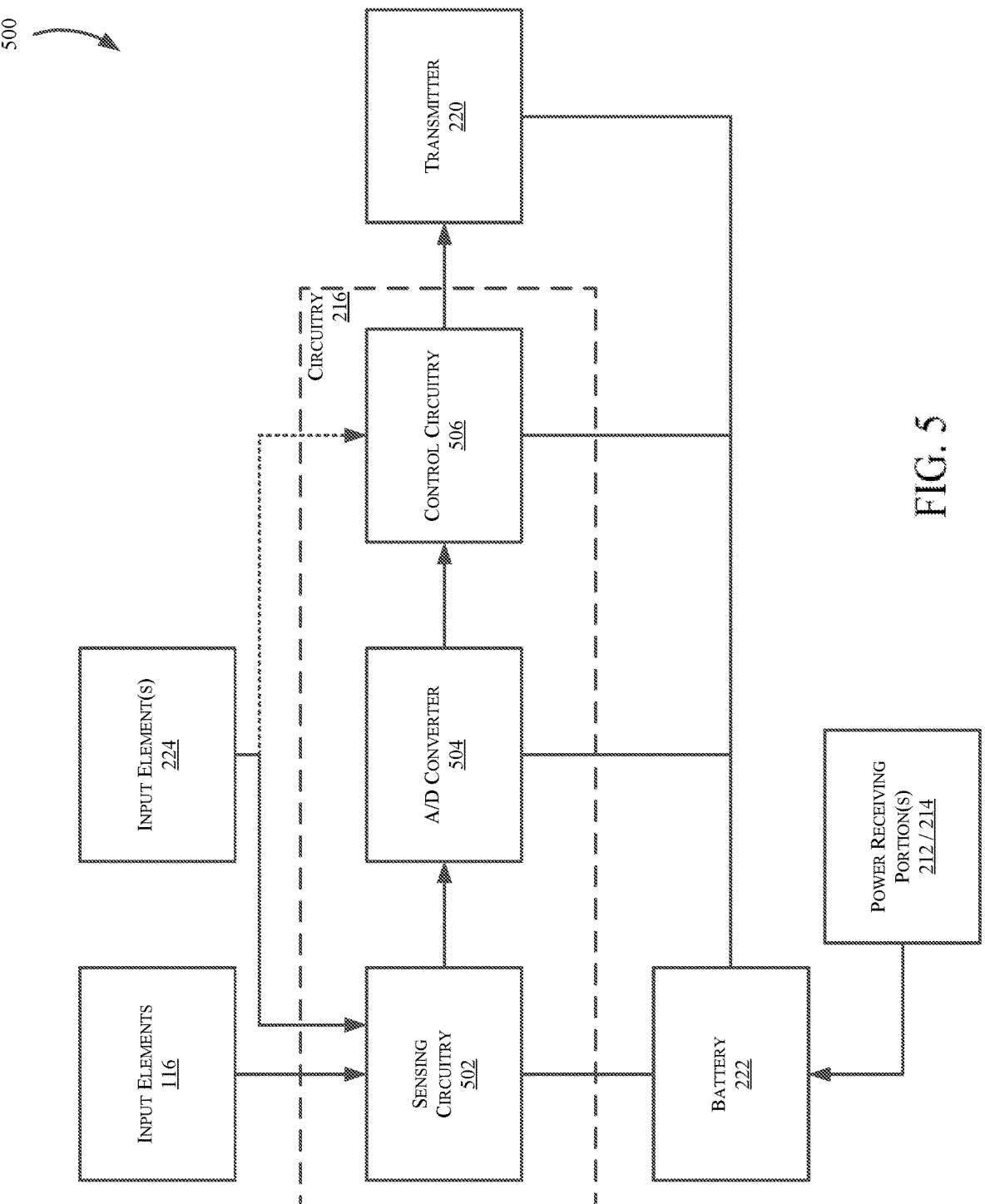
FIG. 5 illustrates a block diagram of the input device of the HUD system according to one or more embodiments.

FIG. 5 shows a functional block diagram 500 of an input unit 112 according to one or more embodiments. The input unit 112 includes the plurality of input elements 116, the one or more input elements 224, the circuitry 216, the battery 222, the first and/or second power receiving portions 212 and 214, and the transmitter 220. The circuitry 216 is configured to send a signal to the transmitter 220 as a result of sensing interactions involving the input elements 116. The circuitry 216 includes sensing circuitry 502, an analog-to-digital (A/D) converter 504, and control circuitry 506. The sensing circuitry 502 senses interactions between pairs of the input elements 116, and that may sense an interaction involving the one or more input elements 224. The sensing circuitry 502 generates an analog output signal corresponding to the sensed interaction between the input elements 116 or an analog output signal corresponding to an interaction involving the one or more input elements 224. The battery 222 may also provide power to the input elements 116 directly or indirectly through the sensing circuitry 502. The sensing circuitry 502 is described in further detail with respect to FIG. 6.

The A/D converter 504 converts the analog output signal received into a corresponding digital signal. The configuration of the A/D converter 504 depends on the analog signal received from the sensing circuit 502. For instance, the A/D converter 504 may convert a DC voltage output from the sensing circuit 502 into a digital signal based on an electrical characteristic of the DC voltage output, such as amplitude. As another example, the A/D converter 504 may convert an AC voltage output from the sensing circuit 502 into a digital signal based on an electrical characteristic of the AC voltage output, such as frequency. In some embodiments, the sensing circuitry 502 may be configured to generate a digital DC voltage. In such embodiments, the sensing circuitry 502 may provide an output to the control circuitry 506 and the A/D converter 504 may be omitted. The A/D converter 504 may sample the signal received from the sensing circuitry 502 at a rate sufficient to register user interactions involving the input elements 116 (e.g., 1 kHz).

The control circuitry 506 causes the transmitter 220 to transmit an input signal to the HUD unit 102 corresponding to the signal received from the A/D converter 504. The control circuitry 506 may include logic for causing the transmitter 220 to transmit an input signal as a result of one or more conditions being satisfied, and not transmit an input signal otherwise. For instance, the control circuitry 506 may cause the input device 112 to operate in an active mode wherein the battery 222 is powering the A/D converter 504, the sensing circuitry 502, and the transmitter 220 if a certain condition is satisfied. The control circuitry 506 may cause the input device 112 to operate in a low-power sleep mode wherein the battery 222 is not powering the sensing circuitry 502, the A/D converter 504, or the transmitter 220 if the condition is not satisfied. The condition may be a user-input related condition, such as a constraint that the user interacted with the input element 224 within a given period of time. That is, the control circuitry 506 may cause the transmitter 220 to transmit input signals if the user has interacted with the input element 224 within a given period of time and not cause the transmitter 220 to transmit the input signal otherwise. In some embodiments, the transmitter 220 may include a receiver that receives signals from the HUD unit 102 causing the control circuitry 506 to transition between the active mode and the sleep mode.

Figure 6:
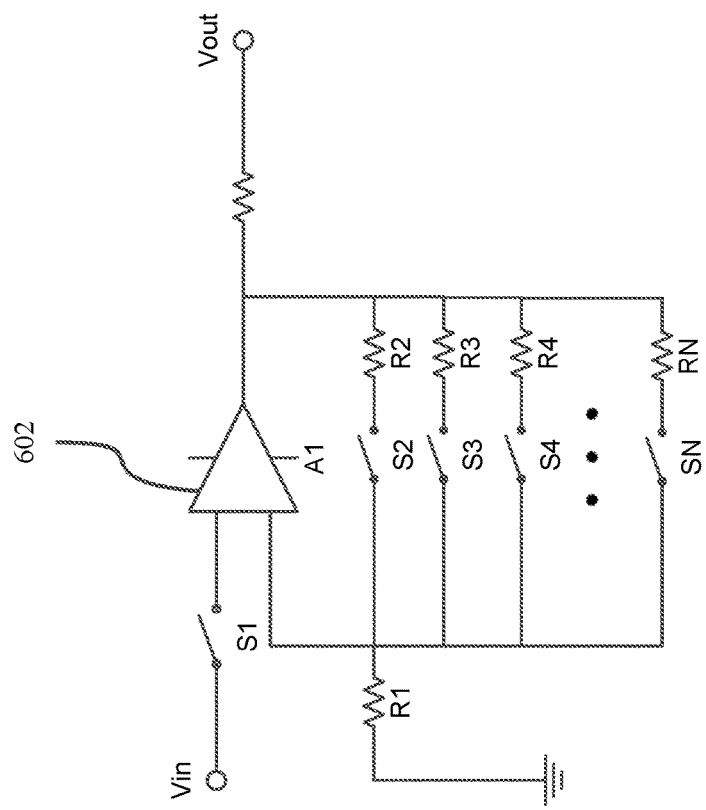
FIG. 6 illustrates an exemplary circuit diagram of sensing circuitry of the input device.

FIG. 6 shows an exemplary circuit diagram of a part of the sensing circuitry 502. The diagram is not intended to be limiting and the sensing circuitry 502 can be implemented in any number of ways without departing from the scope of the instant disclosure. The diagram has a non-inverting amplifier topology comprising an amplifier 602 and a plurality of resistors R1 through RN. The diagram also includes a set of switches S1 through SN, at least some of which are connected in series with corresponding resistors. A fixed DC voltage is applied to the node Vin (e.g., +5 VDC).

In the current embodiment, each of the set of input elements 116 is embodied as a corresponding one of the set of switches S1 through SN. For instance, the input element 202a of the thumb 202 corresponds to the switch S1, the input element 204a of the index finger 204 corresponds to the switch S2, the input element 206a of the middle finger 206 corresponds to the switch S3, and so on. Each of the resistors R2 through RN has a resistor value unique among the resistors R2 through RN. As a result of the user pressing the input element 202a and the input element 204a together, a corresponding first DC voltage is applied to a node Vout, which is connected to the A/D converter 504 or the control circuitry 506. As a result of the user pressing the input element 202a and the input element 206a together, a corresponding second DC voltage different than the first DC voltage is applied to the node Vout. The switches S1 through SN of the current embodiment are electromechanical switches; however, solid-state switches may be implemented in some embodiments.

Those of ordinary skill in the art will appreciate that the sensing circuitry 502 may utilize other circuit and amplifier topologies, such as inverting amplifiers, summing amplifiers, bridges, instrumentation amplifiers, etc., and may include more than one stage. The sensing circuitry 502 may be configured according to the types of input elements 116 implemented. For instance, if capacitive elements or conductive plates are used as input elements 116, the topology of the sensing circuitry 502 may include oscillators, filters, or other topologies that produce an output signal having an electrical characteristic corresponding to the capacitive elements connected as a result of interactions involving the input elements 116.

As one example, the sensing circuitry 502 may include a Wien bridge oscillator or Colpitts oscillator topology that generates an output signal having a frequency characteristic based on a state of the capacitors and/or resistors connected. The sensing circuitry 502 may be an oscillator that includes a plurality of capacitors each having a value unique among the capacitors, and a plurality of switches in series with corresponding capacitors of the oscillator. Interactions between the input elements 116 cause corresponding switches of the oscillator to close, causing the corresponding capacitors to be connected in the oscillator and generating a corresponding frequency. The A/D converter 504 may include a frequency-to-voltage converter for generating a voltage level corresponding to the frequency of the signal received.

In some embodiments, in which the input elements 116 are conductive plates, each of the conductive plates may have different surface areas. The conductive plates may be connected to nodes in an oscillator or other circuit topology for generating a response corresponding to an interaction between conductive plates. For instance, the input element 202a may have a first surface area connected to a first node of a circuit topology, and the other input elements of the remaining appendages may be connected to a second node of the circuit topology. Interactions between the conductive plate of the input element 202a with a first input element (e.g., input element 204a) causes formation of a capacitive value that is unique among a plurality of capacitive values that would be formed as a result of interactions between the input element 202a and another input element (e.g., input element 206a). The capacitive value is formed as a result of the conductive plates being in parallel with and proximate to each other when, for instance, fingertips of the input device 112 are touching.

Figure 7:
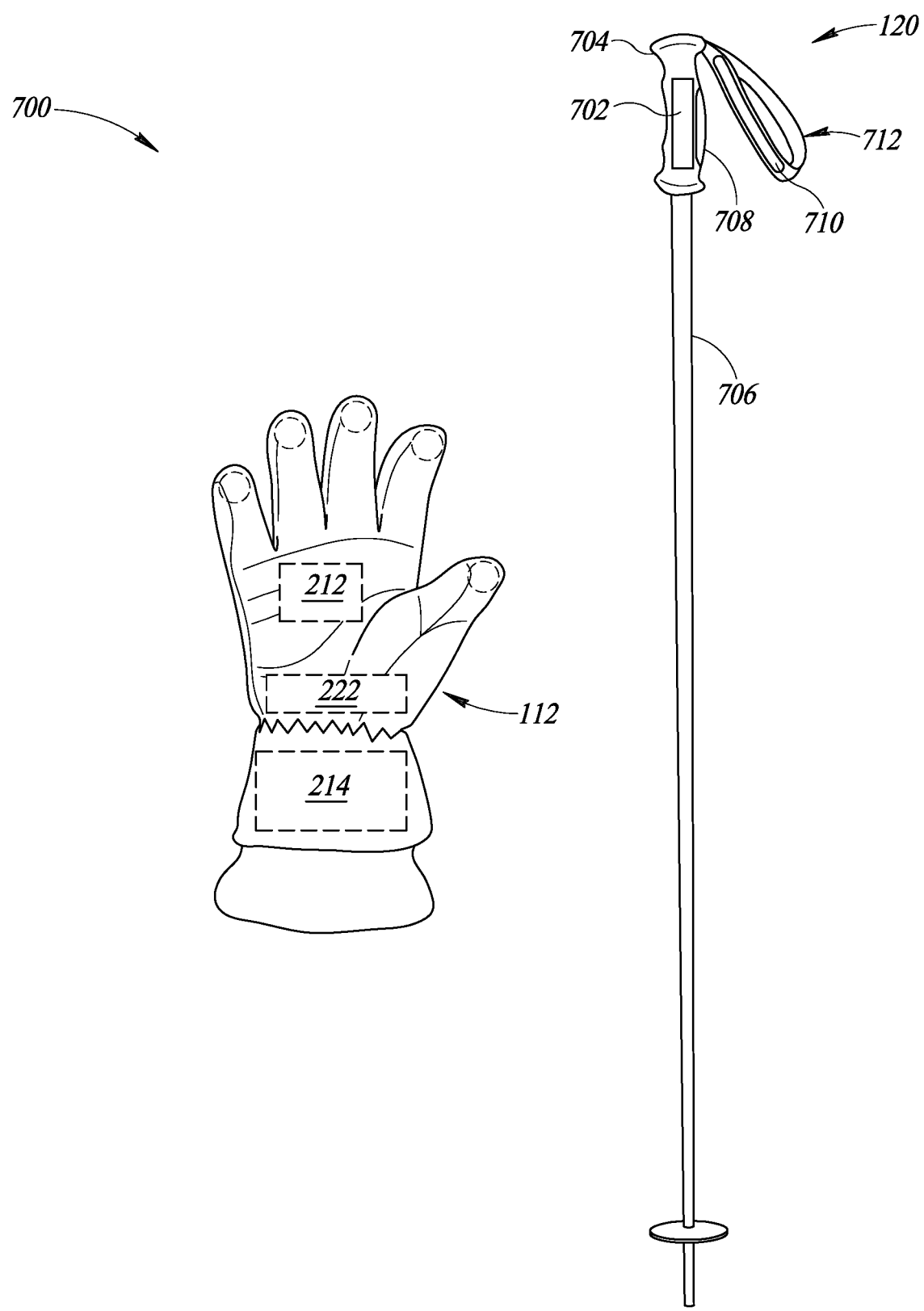
FIG. 7 illustrates a subsystem of the heads-up display system of FIG. 1.

FIG. 7 shows a subsystem 700 of the system 100 according to one or more embodiments. The subsystem 700 includes an input device 112 and a ski pole 120. The Input device 112 is configured as described and depicted in FIGS. 2A through 2C, and includes a battery 222 for storing and providing power to the components of the input device 112. The input device 112 of the subsystem 700 includes one or both of the first power receiving portion 212 and the second power receiving portion 214.

The ski pole 120 includes one or more batteries 702 for storing power and providing power to charge the battery 222 of the input device 112. The one or more batteries 702 may be located in a grip 704 or a shaft 706 of the ski pole 120. The ski pole 120 may include a port (not shown), such as a USB port, electrically coupled to the one or more batteries 702 for connecting a power source to charge the one or more batteries 702 via a conductive cable.

The ski pole 120 may include a first power provisioning portion 708 disposed on or near a surface of the grip 704 for wirelessly transferring power to the battery 222. The first power provisioning portion 708 wirelessly transfers power to the first power receiving portion 212 using principles of induction or magnetic resonance. The first power provisioning portion 708 may include coils that, as a result of alternating current (AC) flowing therethrough, produce a magnetic field. The first power provisioning portion 708 may include circuitry for facilitating wireless power transfer, such as circuitry converting direct current (DC) into AC, and a network of impedance matching components corresponding to impedance matching components of the first power receiving portion 212. When the first power receiving portion 212 is in proximity to the first power provisioning portion 708, the magnetic field generated by the first power provisioning portion 708 flows through the coils of the first power receiving portion 212, and induces corresponding current flow therein that is used to charge the battery 222.

The ski pole 120 may include a second power provisioning portion 710 provided in a wrist strap 712 of the ski pole 120 for wirelessly transferring power to the battery 220 according to principles of induction or magnetic resonance. The second power provisioning portion 710 may be included in the ski pole 120 instead of or in addition to the first power provisioning portion 708. The second power provisioning portion 710 includes circuitry and coils similar to the circuitry and coils described above with respect to the first power provisioning portion 708, and operates in a similar manner, so further description thereof is omitted for brevity. When the second power receiving portion 214 is in proximity to the second power provisioning portion 710, the magnetic field generated by the second power provisioning portion 710 flows through the coils of the second power receiving portion 214 and induces corresponding current flow therein that is used to charge the battery 222.

In some embodiments, the input device 112 may include triboelectric charging elements that provide electric power to charge the battery as a result of contact or rubbing between fingers. For instance, the input elements 206e through 206g and 208e through 208g may be replaced with triboelectric contacts that harvest and transfer charge to the battery 222 as a result of materials covering adjacent fingers rubbing together. In some embodiments, where the body 114 is a relatively thin glove liner, the triboelectric contacts of the glove liner may generate electric energy as a result of the glove liner rubbing against itself or running against the glove encapsulating the glove liner.

The input device(s) 112 may be powered by other acceptable techniques. In some embodiments, the input device 112 may be powered by the HUD unit 102. For instance, the input device 112 may be connected to the HUD unit 102 via a wired connection through which the input device 112 receives power from the battery 328 of the HUD unit 112. In some embodiments, the ski pole 120 may be omitted from the HUD system 100 and the battery 222 may have a capacity sufficient to power the input device 112 for prolonged periods of time. In some embodiments, the battery 222 may be charged by another power source via one or both of the power receiving portions 212 and 214. For instance, a battery located in a jacket, sleeve, or other clothing article may include inductive or resonant elements and circuitry for wirelessly transferring power to the input unit 112. As another example, a wired connection may be established between the battery 222 and a battery located in a clothing article, such as a jacket or sleeve, to charge the battery 222 when necessary. In some embodiments, the battery 222 may be located externally to the input unit 112. The battery 222 may, for instance, be a separate unit that can be stored in a jacket pocket or pants pocket, and the input unit 112 may include a port or wired connection for connecting to and receiving power from the battery 222. In some embodiments, the battery 222 may be charged via a selectively connectable wired connection to the batteries 702 of the ski pole 120.

Figure 8:
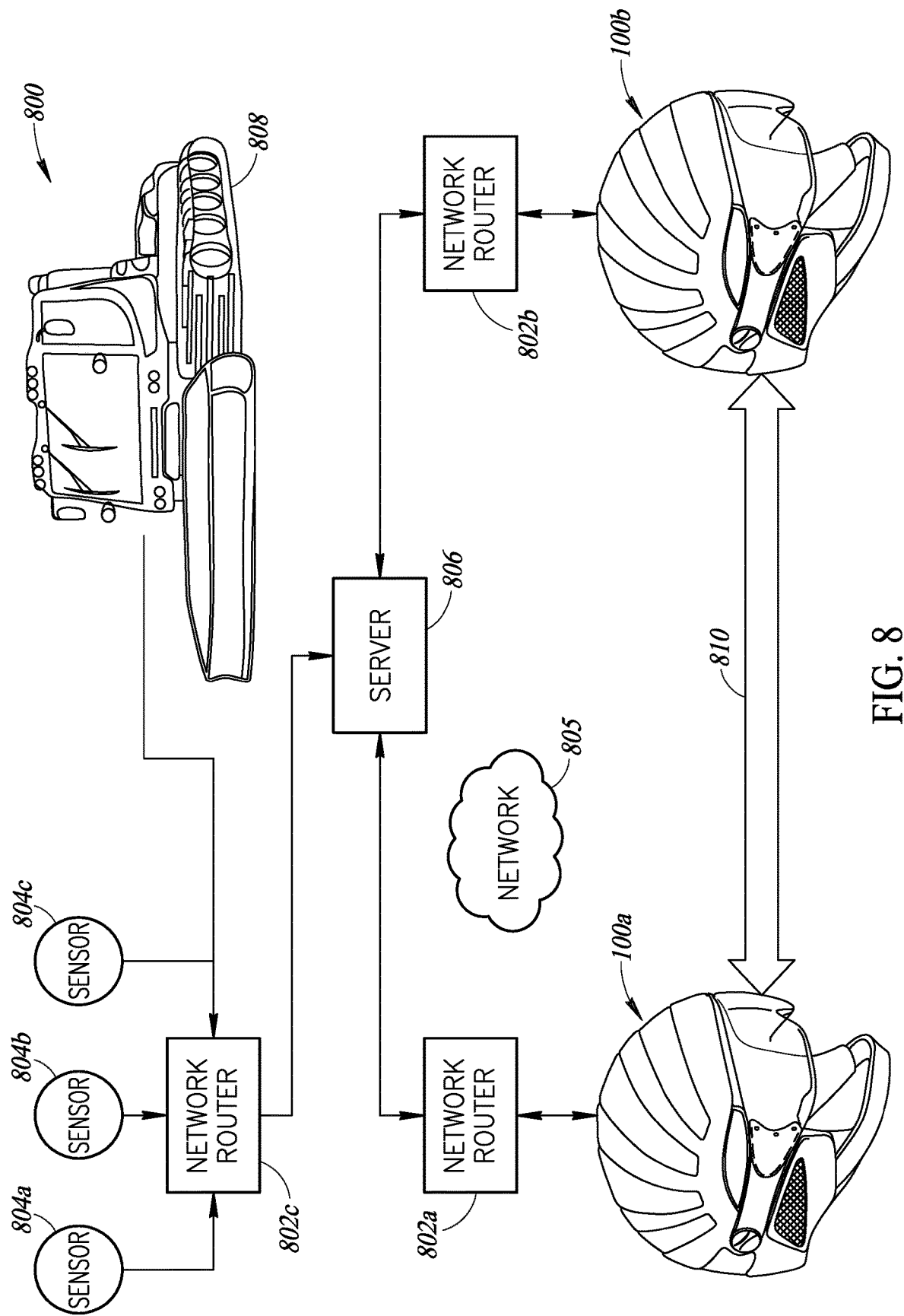
FIG. 8 illustrates an environment in which a plurality of the heads-up display systems operates.

FIG. 8 shows an environment 800 in which a set of HUD systems 100 operate according to one or more embodiments. The environment 800 may be implemented in an outdoor recreational area. The environment 800 includes at least a first HUD system 100a and a second HUD system 100b, a plurality of network routers 802, a plurality of sensors 804 communicatively coupled to one or more of the network routers 802, and a server 806. The environment 800 is provided for illustrative purposes and not intended to be limiting in any way. The environment 800 may include additional servers 800, network routers 802, sensors 804, and HUD systems 100 than depicted and described herein.

The network routers 802 are part of a local area network 805 in the outdoor recreational area. Network-connected devices, such as the HUD systems 100 and the sensors 804, may transmit or receive information over the network 805 via the network routers 802. The network routers 802 may include or be communicatively coupled with communication transceivers, such as Wi-Fi transceivers, for wirelessly sending and receiving information in the network 805. Each of the network routers 802 may be connected with one or more other network routers 802 and with the server 806. Wireless transceivers may be located at various points within the outdoor recreational area for establishing a unified comprehensive network in the outdoor recreational area.

A first network router 802a is connected with or includes a first wireless transceiver that has a communication range covering a first area of the outdoor recreational area, a second network router 802b is connected with or includes a second wireless transceiver that has a communication range covering a second area of the outdoor recreational area, and a third network router 802c is connected with or includes a third wireless transceiver that has a communication range covering a third area of the outdoor recreational area. By way of non-limiting example, the first area may be an area around a chair lift, the second area may be an area of a lodge, and the third area may be an area of a ski slope.

The plurality of sensors 804 are configured to obtain measurements indicative of environmental conditions at locations within the outdoor recreational area. The sensors 804 may include different types of sensors or sensors that can measure more than one environmental characteristic. Examples of the sensors 804 include thermal sensors configured to obtain measurements indicative of a temperature, wind sensors configured to obtain measurements indicative of a wind speed or wind direction, precipitation sensors configured to obtain measurements indicative of precipitation conditions (e.g., whether it is snowing, rate of snowfall), snow sensors configured to obtain measurements regarding snow conditions (e.g., depth of snow at given condition), and cameras for obtaining image data. The plurality of sensors 804 may be communicatively coupled with one or more of the network routers 802 for transmitting measurements obtained over the network 805.

The server 806 includes data storage, one or more processors, and memory storing instructions that, as a result of execution by the one or more processors, cause the server 806 to perform the operations described herein. The server 800 may be located remotely from the outdoor recreational area. The HUD systems 100 may communicate with the server 806 over the network 805 to obtain information regarding the outdoor recreational area. For instance, the HUD system 100a may send a request for information regarding conditions at the third area of the outdoor recreational area. The server 806, in response to the request, may send a command to the third network router 802c to obtain measurements indicative of conditions in the third area. As described herein, the condition information obtained may be related to weather, snow, wait times, or other relevant conditions at locations around the outdoor recreational area. For instance, the server 806 may obtain measurements from the sensors 804 used to generate weather-related information, which may be used to generate the weather-related image content 416. The server 806 may also store the geographic image content 418 or information useable to generate the geographic image content 418. The server 806 may be configured to obtain other types of information related to conditions around the outdoor recreational area.

The environment 800 may include additional equipment 808 that provides information regarding conditions around the outdoor recreational area. For instance, a snowcat for grooming snow may be equipped to periodically transmit location information over the network 805 regarding a location of the snowcat. The server 806 may receive the location information and generate grooming information indicating that a slope at the location reported was groomed at the time the location information was received. The grooming information may be stored in the data storage of the server 806 and provided to a HUD system 100 in response to a request sent to the server 806 over the network 805.

In some embodiments, the HUD systems 100a and 100b may send and receive communications over a private communication channel 810 external to the network of the outdoor recreational area. In some embodiments, the HUD systems 100a and 100b may communicate at least some information with each other over the network 805.

Figure 9:
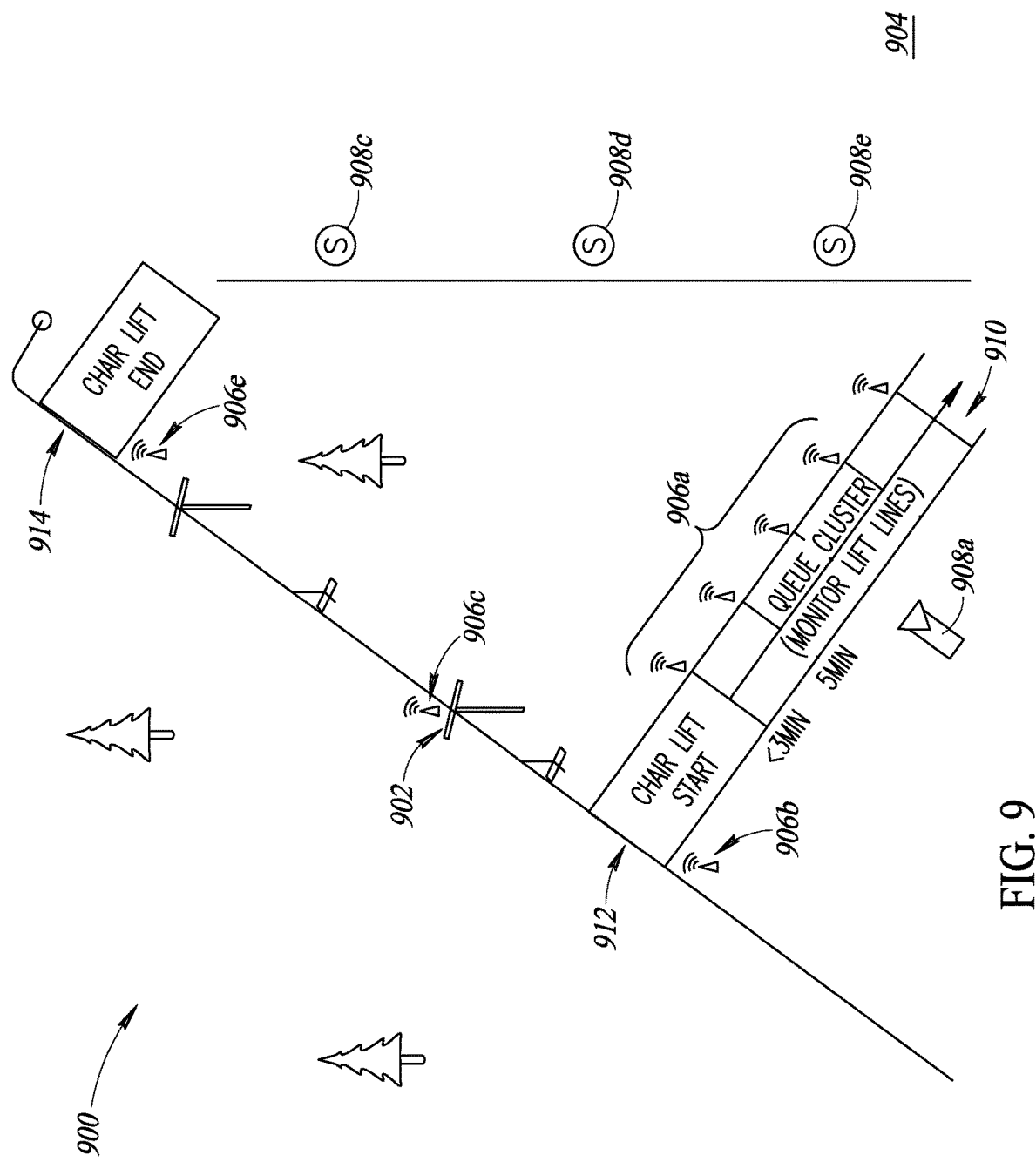
FIG. 9 illustrates a subarea of an outdoor recreational area in which the environment of FIG. 6 may be implemented.

FIG. 9 shows a diagram representative of a subarea 900 of an outdoor recreational ski area according to one or more embodiments. The subarea 900 includes a ski lift 902 for transporting skiers and snowboarders from the bottom to the top of a ski slope 904. The subarea 900 includes a plurality of communication devices 906 connected to the network 805 of the outdoor recreational ski area, and a plurality of sensors 908 communicatively coupled to transmit measurement information over the network 805 via the communication devices 906. The sensors 908 correspond to the sensors 804 of the environment 800, and may be located at various points along the ski slope 904, at various points on the ski lift 902, or at any other relevant location in the subarea 900. Non-limiting examples of the sensors 908 include precipitation sensors, wind sensors, temperature sensors, thermal imaging devices, and cameras.

System components of the environment 800 may provide various benefits to HUD system 100 users located in the subarea 900 and beyond in other areas of the outdoor recreational ski area. As one example, components in the subarea 900 may provide a user of a HUD system 100 in the subarea 900 with information regarding conditions at various points on the ski slope 904 or wait times for the ski lift 902. A queue area 910 of the subarea 900 may be equipped with one or more sensors for determining an amount of time that users will have to wait to board the ski lift 902. In some embodiments, one or more sensors 908a may include cameras or other image capturing devices that capture image data, which is sent over the network 805 for processing by the server 806. The server 806 may receive image data over a period of time and process the image data to determine how long a user in line has waited to board the ski lift 902, or to predict how long a user in line will wait to board the ski lift 902.

In some embodiments, the queue area 910 may have a plurality of communication devices 906a that track a length or wait time of the queue. The communication devices 906a each communicate with a lift pass token or a HUD system 100 possessed by the users to determine a time period taken between a first time when a user enters the queue to a second time when the user boards the ski lift 902. The server 806 may maintain current information regarding various queue areas 910 around the outdoor recreational ski area and provide the information to HUD systems 100 in response to a request for wait time information. The communication devices 906a send information to the server 806 indicating a time progression of one or more users at points in the queue line to a boarding area 912 of the ski lift 902. Alternatively, queue cluster sensors may detect a presence of skiers at points in the queue area 910 and transmit information regarding the measurements to the server 8006, which determines a queue delay time based on the ski lift 902 in motion as gauged by the sensor 906c.

The system 800 also provides safety features to users of the HUD system 100. The boarding area 912, where users board the ski lift 902 at a bottom of the ski lift 902, may be provided with a transmitter 906b that transmits signals to the HUD system 100 to facilitate safe boarding onto the ski lift 902. In particular, the transmitter 906b causes the HUD system 100 to temporarily discontinue or prevent the HUD system 100 from displaying virtual image content while the user is in the boarding area 912. The instructions 306 may include restrictions that cause the processor 302 to prevent or discontinue the virtual image display unit 310 from displaying virtual image content as long as the signal from the transmitter 906b is received, or for a given period of time thereafter. This prevents the user of the HUD system 100 from becoming distracted due to displayed virtual image content while boarding the ski lift 902. The instructions 306 may cause the processor 302 to implement restrictions on other features of the HUD system 100, such as imposing restrictions limiting communications over the communication interface 308 contemporaneous to receiving the signal from the transmitter 906b. Once the HUD system 100 is out of range of the transmitter 906b, the HUD system 100 may permit the virtual image display unit 110 to present virtual image content once again.

One or more communication devices 906c may be located at positions along the ski lift 902 for enabling users of the HUD systems 100 to communicate while on the ski lift 902. One or more sensors 908c, 908d, 908e, etc., may be located at positions along the ski lift 902 for enabling users of the HUD systems 100 to determine weather conditions on the ski lift 902. Sensors 906c located on or associated with the ski lift 902 may monitor cable movement to track real-time delays in lift momentum, which can be used together with the queue cluster information to accurately determine lift delay or wait times.

The ski slope 904 and/or ski lift 902 may have cameras that capture images at various points along the trail. The ski slope 904 and/or ski lift 902 may also include a plurality of sensors 908 positioned at various points for measuring conditions, such as temperature, wind speed, and wind direction. The sensors 908 located along the ski slope 904 may also take measurements regarding a depth of snow, rate of snowfall, and other measurements regarding run snow conditions, which are reported to the server 806.

A transmitter 906e is located in or around a disembarking area 914 located at the top of the ski lift 902, which provides safety features to users of HUD systems 100 in a manner similar to the transmitter 906c. Specifically, the transmitter 906e transmits a signal that, as a result of being received by a HUD unit 102, causes the processor 302 thereof to impose certain restrictions on operations of the virtual image display unit 110 or other part of the HUD unit 102. The processor 302 may prevent the virtual image display unit 110 from displaying virtual image content while the signal is received from the transmitter 906e or for a given period of time after the signal stops being received. This prevents the user from becoming distracted by virtual image content while disembarking from the ski lift 902.

The outdoor recreational ski area may include transceivers and sensors strategically located along ski slopes, within lodges, and even in out-of-bounds areas. It should be appreciated that the concepts and technology described herein are applicable to other outdoor recreational areas, such as mountain biking resorts, paintball sports parks, cross-country ski areas, snowmobile trails, golf courses, beaches, state or national parks, amusement parks, skate parks, etc., and may be applicable to even some indoor environments, such as laser tag facilities or industrial warehouses. The heads-up display system 100 may be useable in urban settings by, for example, bicycle riders to efficiently obtain information regarding directions to a destination, traffic, historical routes, etc. In such implementations, the network routers 802 or sensors 804 may be strategically distributed throughout a city grid to facilitate access to information and communication between users. Using the input device 112, the rider may command the HUD system 100 to obtain and display turn-by-turn directions via the virtual image display unit 110.

References to the term "set" (e.g., "a set of items"), as used herein, unless otherwise noted or contradicted by context, is to be construed as a nonempty collection comprising one or more members or instances.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions, and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention, and does not pose a limitation on the scope of the invention unless otherwise claimed. No language in the specification should be construed as indicating any non-claimed element as essential to the practice of the invention.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
a server including one or more processors, memory, and a set of instructions stored in the memory,
wherein the set of instructions, when executed by the one or more processors, cause the one or more processors to:
associate, in the memory, a plurality of sensors with locations in an outdoor recreational area;
receive condition information specifying environmental conditions from one or more networking devices of a plurality of networking devices;
receive, from a Heads Up Display (HUD) unit, a request for condition information indicating conditions at a location within the outdoor recreational area; and
transmit the condition information indicating conditions at the location for fulfillment of the request.

2. The system of claim 1 wherein a first networking device of the one or more networking devices includes a first wireless transceiver that has a communication range covering a first area of the outdoor recreational area, a second networking device of the one or more networking devices includes a second wireless transceiver that has a communication range covering a second area of the outdoor recreational area, the request for condition information indicating conditions at the location within the outdoor recreational area is a request for information regarding conditions at the first area of the outdoor recreational area covered by the communication range of the first wireless transceiver, and the receiving the condition information includes receiving from the first networking device the information regarding conditions at the first area of the outdoor recreational area.

3. The system of claim 2 wherein the wireless transceivers are located at various points within the outdoor recreational area for establishing a unified comprehensive network in the outdoor recreational area.

4. The system of claim 2, wherein the set of instructions, when executed by the one or more processors, further cause the one or more processors to:
receive, from the HUD unit, a request for condition information indicating conditions at a third area of the outdoor recreational area;
in response to the request for condition information indicating conditions at the third area, send a command to a third networking device of the one or more networking devices to obtain measurements indicative of conditions in the third area, wherein the third networking device includes a third wireless transceiver that has a communication range covering the third area of the outdoor recreational area;
receive from the third networking device the measurements indicative of conditions in the third area; and
transmit the condition information indicating conditions at the third area of the outdoor recreational including the measurements indicative of conditions in the third area for fulfillment of the request.

5. The system of claim 2, wherein the set of instructions, when executed by the one or more processors, further cause the one or more processors to:
transmit, from a networking device to the HUD unit, a signal to prevent or discontinue a virtual image display unit of the HUD unit from displaying virtual image content for safety when the HUD unit is in a particular area of the outdoor recreational area.

6. The system of claim 5, wherein the particular area of the outdoor recreational area is the second area covered by the communication range of the second wireless transceiver and the transmitting, to the HUD unit, the signal to prevent or discontinue the virtual image display unit of the HUD unit from displaying virtual image content for safety when the HUD unit is in the particular area of the outdoor recreational area includes transmitting the signal from a transmitter of the second networking device to prevent or discontinue the virtual image display unit of the HUD unit from displaying virtual image content for safety as long as the signal from the transmitter is received by the HUD unit.

7. The system of claim 1 wherein the condition information includes information related to one or more of: weather, snow, and queue wait times.

8. The system of claim 1 wherein the server is located remotely from the outdoor recreational area.

9. The system of claim 1 wherein the plurality of sensors includes one or more of: precipitation sensors, wind sensors, temperature sensors, thermal imaging devices, and cameras.

10. A method comprising:
    associating, in a memory device, a plurality of sensors with locations in an outdoor recreational area;
    receiving condition information generated by the plurality of sensors from ft one or more networking devices of a plurality of networking devices;
    receiving, from Heads-Up Display (HUD) unit, a request for condition information indicating conditions at a location within the outdoor recreational area; and
    transmitting the condition information indicating conditions at the location for fulfillment of the request.

11. The method of claim 10 wherein a first networking device of the plurality of networking devices includes a first wireless transceiver that has a communication range covering a first area of the outdoor recreational area, a second networking device of the plurality of networking devices includes a second wireless transceiver that has a communication range covering a second area of the outdoor recreational area, the request for condition information indicating conditions at the location within the outdoor recreational area is a request for information regarding conditions at the first area of the outdoor recreational area covered by the communication range of the first wireless transceiver, and the receiving the condition information includes receiving from the first networking device the information regarding conditions at the first area of the outdoor recreational area.

12. The method of claim 11 wherein the wireless transceivers are located at various points within the outdoor recreational area for establishing a unified comprehensive network in the outdoor recreational area.

13. The method of claim 11, further comprising:
    receiving, from the HUD unit, a request for condition information indicating conditions at a third area of the outdoor recreational area;
    in response to the request for condition information indicating conditions at the third area, sending a command to a third networking device to obtain measurements indicative of conditions in the third area, wherein the third networking device of the one or more networking devices includes a third wireless transceiver that has a communication range covering the third area of the outdoor recreational area;
    receiving from the third networking device the measurements indicative of conditions in the third area; and
    transmitting the condition information indicating conditions at the third area of the outdoor recreational including the measurements indicative of conditions in the third area for fulfillment of the request.

14. The method of claim 11, further comprising:
    transmitting, from a networking device to the HUD unit, a signal to prevent or discontinue a virtual image display unit of the HUD unit from displaying virtual image content for safety when the HUD unit is in a particular area of the outdoor recreational area.

15. The method of claim 14, wherein the particular area of the outdoor recreational area is the second area covered by the communication range of the second wireless transceiver and the transmitting, to the HUD unit, the signal to prevent or discontinue the virtual image display unit of the HUD unit from displaying virtual image content for safety when the HUD unit is in the particular area of the outdoor recreational area includes transmitting the signal from a transmitter of the second networking device to prevent or discontinue the virtual image display unit of the HUD unit from displaying virtual image content for safety as long as the signal from the transmitter is received by the HUD unit.

16. The method of claim 10 wherein the condition information includes information related to one or more of: weather, snow, and queue wait times.

17. The method of claim 10 wherein the server is located remotely from the outdoor recreational area.

18. The method of claim 10 wherein the plurality of sensors includes one or more of: precipitation sensors, wind sensors, temperature sensors, thermal imaging devices, and cameras.

* * * * *